(12) United States Patent
Ishihara et al.

(10) Patent No.: US 8,488,696 B2
(45) Date of Patent: Jul. 16, 2013

(54) RECEIVER DEVICE, COMMUNICATION SYSTEM AND RECEIVING METHOD

(75) Inventors: Koichi Ishihara, Yokosuka (JP); Takayuki Kobayashi, Yokosuka (JP); Riichi Kudo, Yokosuka (JP); Yasushi Takatori, Yokosuka (JP); Munehiro Matsui, Yokosuka (JP); Masato Mizoguchi, Yokosuka (JP); Akihide Sano, Yokosuka (JP); Eiichi Yamada, Atsugi (JP); Etsushi Yamazaki, Yokosuka (JP); Yutaka Miyamoto, Yokosuka (JP); Hideyuki Nosaka, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 333 days.

(21) Appl. No.: 12/994,365

(22) PCT Filed: Jun. 19, 2009

(86) PCT No.: PCT/JP2009/061228
§ 371 (c)(1),
(2), (4) Date: Nov. 23, 2010

(87) PCT Pub. No.: WO2009/154278
PCT Pub. Date: Dec. 23, 2009

(65) Prior Publication Data
US 2011/0129041 A1    Jun. 2, 2011

(30) Foreign Application Priority Data

Jun. 20, 2008 (JP) ................................ 2008-162478
Aug. 19, 2008 (JP) ................................ 2008-210926
Apr. 28, 2009 (JP) ................................ 2009-109962

(51) Int. Cl.
*H04K 1/10* (2006.01)

(52) U.S. Cl.
USPC ........................................................ 375/260

(58) Field of Classification Search
USPC .................. 375/259–262, 265, 267; 370/208, 370/210
See application file for complete search history.

(56) References Cited

U.S. PATENT DOCUMENTS

2004/0109508 A1 * 6/2004 Jeon et al. ...................... 375/260
2006/0198472 A1 9/2006 Nakamura et al.
(Continued)

FOREIGN PATENT DOCUMENTS

CN       1237054 A      12/1999
JP       11-298403 A    10/1999
(Continued)

OTHER PUBLICATIONS

A. Gusmao, R. Dinis, and N. Esteves, "On frequency-domain equalization and diversity combining for broadband wireless communications," IEEE Trans. Commun., vol. 51, No. 7, pp. 1029-1033, Jul. 2003.

(Continued)

*Primary Examiner* — Young T. Tse
(74) *Attorney, Agent, or Firm* — Harness, Dickey & Pierce, P.L.C.

(57) ABSTRACT

A receiver device receives a signal inputted to one or a plurality of ports as a plurality of received signals, and includes: a phase offset estimating unit that, on the basis of a unique word of each signal block contained in said received signal, estimates the phase offset, and a phase offset compensating unit that, on the basis of a phase offset estimated by said phase offset estimating unit, compensates the phase offset; the receiver device uses a known signal component (unique word) contained in a frequency-domain equalized signal to compensate the phase offset, whereby it compensates complex phase offset fluctuation, and estimates the phase offset of a signal obtained at each port.

24 Claims, 12 Drawing Sheets

U.S. PATENT DOCUMENTS

2007/0268976 A1* 11/2007 Brink et al. ............... 375/260
2009/0074086 A1* 3/2009 Murakami et al. ......... 375/260
2009/0201984 A1* 8/2009 Du ............................. 375/240

FOREIGN PATENT DOCUMENTS

| | | |
|---|---|---|
| JP | 2003-283359 | 10/2003 |
| JP | 2003-332952 | 11/2003 |
| JP | 2005-252653 | 9/2005 |
| JP | 2006-197132 | 7/2006 |
| JP | 2006-246129 | 9/2006 |
| JP | 2007-266736 | 10/2007 |

OTHER PUBLICATIONS

L. Deneire, et al., "Training sequence versus cyclic prefix a new look on single carrier communication," IEEE Commun., Lett., pp. 1056-1060, 2000.

D. Falconer, et al., "Frequency domain-equalization for single-carrier broadband wireless systems," IEEE Commun. Mag., vol. 40, No. 4, pp. 58-66, Apr. 2002.

S. J. Savory, et al., "Electronic compensation of chromatic dispersion using a digital coherent receiver," Optics express, vol. 15, No. 5, pp. 2120-2126, Mar. 2007.

D. C. Chu, "Polyphase codes with good periodic correlation properties," IEEE Trans. Inf. Theory, vol. 5, No. 7, pp. 531-532, Jul. 1972.

I. Barhumi, et al., "Optimal Training Sequences for Channel Estimation in MIMO OFDM Systems in Mobile Wireless Channels," Broadband Communications, 2002. Access, Transmission, Networking. pp. 44-1-44-6, 2002.

Office Action, Chinese Patent Application No. 200980120603.2, Jan. 7, 2013.

* cited by examiner

US 8,488,696 B2

RECEIVER DEVICE, COMMUNICATION SYSTEM AND RECEIVING METHOD

TECHNICAL FIELD

The present invention relates to a receiver device, a communication system, and a receiving method in wireless communication and optical communication.

Priority is claimed on Japanese Patent Application (JPA) No. 2008-162478, filed Jun. 20, 2008, JPA No. 2008-210926, filed Aug. 19, 2008, and JPA No. 2009-109962, filed Apr. 28, 2009, the contents of which are incorporated herein by reference.

BACKGROUND ART

FIG. 13 is an example of a conventional receiver device for single-carrier transmission using frequency-domain equalization (FDE). This receiver device includes receiving units 101-1 to 101-R, timing detectors 102-1 to 102-R, frequency offset compensating units 103-1 to 103-R, serial-to-parallel converters 104-1 to 104-R, fast Fourier transform (FFT) computation units 105-1 to 105-R, equalizers 106-1 to 106-R, weight operation units 107-1 to 107-R, a signal synthesizer 108, an inverse fast Fourier transform (IFFT) operation unit 109, a parallel-to-serial converter 110, a demodulator 111, and a local oscillator 112. Here, R represents a number of import ports.

In this single-carrier receiver device, received single-carrier signals supplied from R-pieces of communication ports of the receiver are converted using an oscillating signal from the local oscillator 112 to base-band digital signals in the receiving units 101-1 to 101-R.

By using a preamble signal for each port, the timing detectors 102-1 to 102-R detect signal positions and timings of the signals converted in the receiving units 101-1 to 101-R.

The frequency offset compensating units 103-1 to 103-R use preamble signals contained in the received single-carrier signals to estimate the frequency offset of the signals that were timing-detected by the timing detectors 102-1 to 102-R, and compensate them based on this estimated frequency offset.

The preamble signals are then supplied to the weight operation units 107-1 to 107-R, which calculate their equalization weights.

The serial-to-parallel converters 104-1 to 104-R execute a serial-to-parallel conversion of the data signal, and the FFT operation units 105-1 to 105-R then perform an FFT operation to obtain a frequency component of the received signal. The equalizers 106-1 to 106-R use weights calculated by the weight operation units 107-1 to 107-R to equalize the received signal in the frequency domain.

Thereafter, the signal synthesizer 108 synthesizes the frequency components, namely the signals of the ports, and the IFFT operation unit 109 executes an IFFT operation to convert this signal to a time signal. The signal that was converted to a time signal is subjected to a parallel-to-serial conversion by the parallel-to-serial converter 110, and is then modulated in the demodulator 111. Thus the single-carrier receiver obtains a transmitted data sequence.

FIG. 14 shows the configuration of a frequency offset compensating unit 103-$r$ at port number r (=1 to R). The frequency offset compensating unit 103-$r$ includes an offset estimating unit 1031-$r$ and an offset compensating unit 1032-$r$. The offset estimating unit 1031-$r$ uses a preamble signal contained in a received single-carrier signal from a corresponding timing detector 102-$r$ (=1 to R) to calculate a frequency offset estimated value, and outputs the calculated frequency offset estimated value to the offset compensating unit 1032-$r$.

The offset compensating unit 1032-$r$ uses the offset estimated value calculated by the offset estimating unit 1031-$r$ to compensate the offset of the received data signal contained in a received single-carrier signal from a corresponding timing detector 102-$r$ (=1 to R), and outputs the result to a corresponding serial-to-parallel converter 104-$r$ (=1 to R).

Non-Patent Document 1, below, describes conventional technology relating to the single-carrier receiver shown in FIG. 13.

[Non-Patent Document 1]: A. Gusmao, R. Dinis, and N. Esteves, "On frequency-domain equalization and diversity combining for broadband wireless communications," IEEE Trans. Commun., vol. 51, no. 7, PP. 1029-1033, July 2003.

DISCLOSURE OF INVENTION

Problem to be Solved by the Invention

However, in optical or wireless transmission, instability of the local oscillator or devices in the receiver is known to create phase offset. For that reason, in the single-carrier receiver shown in Non-Patent Document 1, since the transmitting and receiving reference frequencies are different when performing optical or wireless transmission, there is a problem that phase offset is created.

While a method that uses a preamble signal to compensate frequency offset is proposed as in the conventional technology, in cases where there is temporal phase offset instability or fluctuation, or when the phase offsets of the receive ports do not match, there is a problem that the phase offset cannot be completely compensated. This problem is especially noticeable in optical transmission, where the carrier frequency is less stable than in wireless transmission.

Furthermore, since the transmitting and receiving reference frequencies are different when performing optical or wireless transmission, there is a problem that frequency offset is created. While a method that uses a preamble signal to compensate frequency offset is proposed as in the conventional technology, in cases where there is temporal frequency offset instability or fluctuation, or when the frequency offsets of the receive ports do not match, there is a problem that the frequency offset cannot be completely compensated.

The present invention has been realized to solve the above problems. An object of the present invention is therefore to provide a receiver device, a communication system, and a receiving method that can compensate phase offset even when there is temporal phase offset instability or fluctuation, or when the phase offsets of the receive ports do not match.

It is another object of the invention to provide a receiver device, a communication system, and a receiving method that can compensate frequency offset, even when the frequency is unstable or the frequencies of the receive ports do not match.

Means for Solving the Problem

According to the present invention, a receiver device that receives a signal supplied to one or a plurality of ports as one or a plurality of received signals, comprises: one or a plurality of processors that includes a timing detector that performs timing detection by detecting the signal position of each of the received signals allocated beforehand from among the one or plurality of received signals in order to form a signal waveform of the received signals allocated beforehand, a frequency offset compensating unit that compensates a frequency offset of the received signal that is timing-detected by the timing detector, a serial-to-parallel converter that subjects the received signal compensated by the frequency offset compensating unit to a serial-to-parallel conversion, a Fourier transform unit that performs a Fourier transform of the received signal subjected to the serial-to-parallel conversion by the serial-to-parallel converter, an equalizer that equalizes the received signal subjected to the Fourier transform by the Fourier transform unit to each frequency component, an inverse Fourier transform unit that subjects the received signal equalized by the equalizer to an inverse Fourier transform, and a parallel-to-serial converter that subjects the received signal subjected to the inverse Fourier transform by the inverse Fourier transform unit to a parallel-to-serial conversion; a signal synthesizer that synthesizes the signal waveform formed by the one or plurality of the processors; a demodulator that demodulates the signal waveform synthesized by the signal synthesizer; a phase offset estimating unit arranged on a received signal conversion path that runs from the timing detector to the demodulator to estimate the phase offset of the supplied received signal on the basis of a unique word of each signal block contained in the received signal; and a phase offset compensating unit arranged on the received signal conversion path to compensate the phase offset of the received signal on the received signal conversion path on the basis of the phase offset estimated by the phase offset estimating unit.

A communication system according to the present invention comprises: a transmitter device that transmits a transmitted signal in which a unique word is added to each signal block thereof, and a receiver device that receives a signal supplied to one or a plurality of ports as one or a plurality of received signals; the receiver device comprising: one or a plurality of processors that comprises a timing detector that performs timing detection by detecting a signal position of each of received signals allocated beforehand from among the one or plurality of received signals in order to form a signal waveform of the received signals allocated beforehand, a frequency offset compensating unit that compensates a frequency offset of the received signal that is timing-detected by the timing detector, a serial-to-parallel converter that subjects the received signal compensated by the frequency offset compensating unit to a serial-to-parallel conversion, a Fourier transform unit that performs a Fourier transform of the received signal subjected to the serial-to-parallel conversion by the serial-to-parallel converter, an equalizer that equalizes the received signal subjected to the Fourier transform by the Fourier transform unit to each frequency component, an inverse Fourier transform unit that subjects the received signal equalized by the equalizer to an inverse Fourier transform, and a parallel-to-serial converter that subjects the received signal subjected to the inverse Fourier transform by the inverse Fourier transform unit to a parallel-to-serial conversion; a signal synthesizer that synthesizes the signal waveform formed by the one or plurality of the processors; a demodulator that demodulates the signal waveform synthesized by the signal synthesizer; a phase offset estimating unit arranged on a received signal conversion path that runs from the timing detector to the demodulator to estimate the phase offset of the supplied received signal on the basis of a unique word of each signal block contained in the received signal; and a phase offset compensating unit arranged on the received signal conversion path to compensate the phase offset of the received signal on said received signal conversion path on the basis of the phase offset estimated by the phase offset estimating unit.

Moreover, a receiving method of the present invention is used in a receiver device that receives a signal supplied to one or a plurality of ports as one or a plurality of received signals, and includes: a processing step executed with respect to the one or a plurality of received signals and including: a timing-detection step of performing timing detection by detecting a signal position of a received signal allocated beforehand from among the one or plurality of received signals; a frequency offset compensation step of compensating a frequency offset of the received signal that is timing-detected in the timing detection step, a serial-to-parallel conversion step of subjecting the received signal compensated in the frequency offset compensation step to a serial-to-parallel conversion, a Fourier transform step of performing a Fourier transform of the received signal subjected to the serial-to-parallel conversion in the serial-to-parallel conversion step, an equalization step of equalizing the received signal subjected to the Fourier transform in the Fourier transform step to each frequency component, an inverse Fourier transform step of subjecting the received signal equalized in the equalization step to an inverse Fourier transform, and a parallel-to-serial conversion step of subjecting the received signal subjected to the inverse Fourier transform in the inverse Fourier transform step to a parallel-to-serial conversion; a signal synthesis step of synthesizing the signal waveform formed in the one or plurality of received signal processing steps; a demodulation step of demodulating the signal waveform synthesized in the signal synthesis step; a phase offset estimation step performed in a received signal conversion step that runs from the timing detection step to the demodulation step to estimate the phase offset of the supplied received signal on the basis of a unique word of each signal block contained in the received signal; and a phase offset compensation step performed in the received signal conversion step to compensate the phase offset of the received signal in said received signal conversion step on the basis of the phase offset estimated in the phase offset estimation step.

In the embodiments of the present invention, the phase offset estimating unit and the phase offset estimation step preferably estimate said phase offset θ(q) of said supplied received signal according to the following general equation:

$$\theta(q) = \arg\left\{\sum_{m=1}^{M} y(m, q)x(m)^*\right\}$$

where y(m,q) is the supplied received signal in the q-th signal block, x(m) is a unique word sequence, parameter m is an identification variable for sequentially identifying each unique word block of M blocks, * denotes a complex conjugate, and arg is a function for determining the angle.

Effect of the Invention

According to the present invention, by compensating phase offset using a known signal component (unique word) contained in a signal equalized in the frequency domain, it is possible to compensate complex phase offset fluctuation. Moreover, by estimating the phase offset of each signal obtained at each port, the phase offsets can be compensated even when there is temporal phase offset instability or fluctuation, or when the phase offsets of the receive ports do not match.

Further, according to the invention, in transmitting a signal, when using a unique word UW as a guard interval GI used in frequency-domain equalization, the sequence is repeatedly inserted. On the receiving side, the frequency offset is estimated using the unique word UW that is repeated multiple times in each block prior to frequency-domain equalization, and the estimated frequency offset is used in the compensation. Therefore, even when the frequency is unstable or the frequencies at the receive ports do not match, the invention re-compensates any frequency offset that cannot be fully compensated with a time-multiplexed preamble signal in each block at each port, prior to using a unique word UW for equalization. In this way, the frequency offset can be compensated, and transmission characteristics can be enhanced.

EMBODIMENTS FOR CARRYING OUT THE INVENTION

First Embodiment

Figure 1:
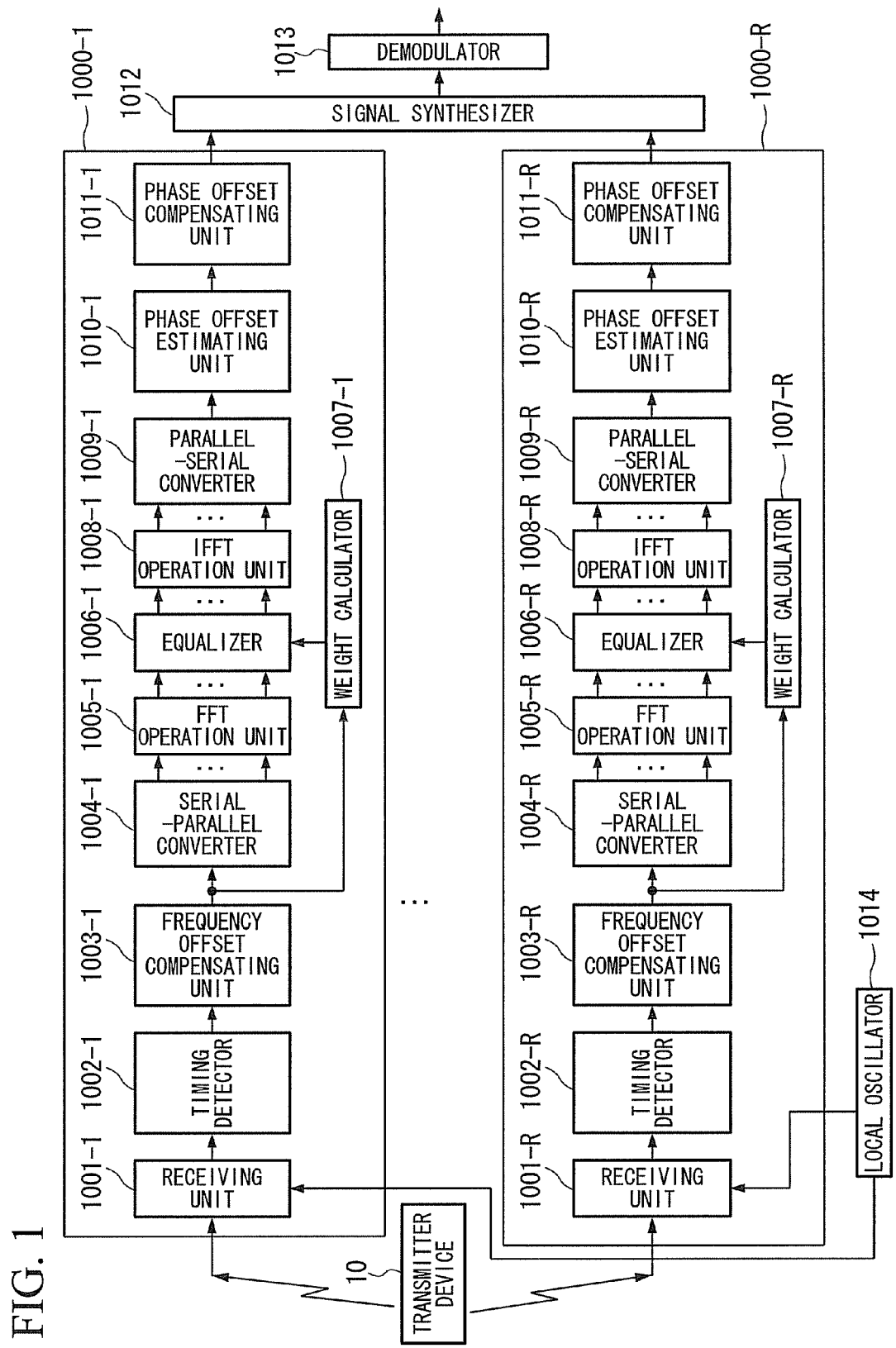
FIG. 1 is a block diagram showing a receiver device according to a first embodiment of the invention.

Embodiments of the invention will be explained with reference to the drawings. FIG. 1 is a schematic block diagram of the configuration of a receiver device according to an embodiment of the invention. The receiver device receives a single-carrier signal, transmitted from a transmitter device 10, as a plurality of received signals, e.g. R received signals. Here R ($\geq$1) is the number of antennas or the number of antenna elements being used for wireless transmission. The receiver device described below has R ports.

In this explanation, the receiver device receives a signal that includes a predetermined signal as a unit word in each signal block. In this explanation, the received signal also includes a preamble signal. The unique word and the preamble signal will be explained below using FIG. 2.

The receiver device includes a plurality of processors 1000-1 to 1000-R that each form a signal waveform of a received signal allocated beforehand from among a plurality of received signals, a signal synthesizer 1012 that synthesizes signal waveforms formed by the plurality of processors 1000-1 to 1000-R, a demodulator 1013 that demodulates the signal waveform synthesized by the signal synthesizer 1012, and a local oscillator 1014.

Each of the processors 1000-1 to 1000-R has the same configuration. The configuration of processor 1000 will be explained here as one of the plurality of processors 1000-1 to 1000-R.

The processor 1000 includes a receiving unit 1001, a timing detector 1002, a frequency offset compensating unit 1003, a serial-to-parallel converter 1004, an FFT operation unit 1005 (Fourier converter), an equalizer 1006, a weight calculator 1007, an IFFT operation unit 1008 (inverse Fourier converter), a parallel-to-serial converter 1009, a phase offset estimating unit 1010, and a phase offset compensating unit 1011.

The receiving unit 1001 receives a signal from a corresponding antenna element, and uses an oscillating signal from the local oscillator 1014 to convert the received signal to a baseband digital signal. The timing detector 1002 detects the signal position of the received signal that the receiving unit 1001 converted to a baseband digital signal, i.e. the received signal allocated beforehand, and performs a timing detection. The signal position is detected based on, for example, the preamble signal contained in the signal.

The frequency offset compensating unit 1003 compensates the frequency offset of the received signal that was timing-detected by the timing detector 1002. The weight calculator 1007 calculates an equalization weight based on the preamble signal contained in the received signal that the frequency offset compensating unit 1003 compensated. The serial-to-parallel converter 1004 makes a serial-to-parallel conversion of the received signal that the frequency offset compensating unit 1003 compensated.

The FFT operation unit 1005 executes a Fourier transform of the received signal that was subjected to a serial-to-parallel conversion by the converter 1004. The equalizer 1006 equalizes the received signal that was subjected to a Fourier transform by the FFT operation unit 1005 in each frequency component based on the equalization weight calculated by the weight calculator 1007. The IFFT operation unit 1008 executes an inverse Fourier transform of the received signal that the equalizer 1006 equalized. The parallel-to-serial converter 1009 executes a parallel-to-serial conversion of the received signal that was subjected to an inverse Fourier transform by the IFFT operation unit 1008.

The path from the timing detector 1002 to the support frame 13 is termed the received signal conversion path, and the phase offset estimating unit 1010 is arranged on this received signal conversion path. Specifically, in this embodiment, the phase offset estimating unit 1010 is provided in a stage following the parallel-to-serial converter 1009, and estimates the phase offset based on the received signal that was subjected to a parallel-to-serial conversion by the parallel-to-serial converter 1009. When estimating the phase offset, the phase offset estimating unit 1010 estimates the phase offset for each signal block in the received signal based on the unique word of each signal block.

The phase offset compensating unit 1011 is provided on the received signal conversion path in a stage later than the phase offset estimating unit 1010, and, based on the phase offset estimated by the phase offset estimating unit 1010, compensates the phase offset of the received signal that was subjected to a parallel-to-serial conversion by the parallel-to-serial converter 1009. Also, the phase offset compensating unit 1011 compensates the phase offset of the received signal that was subjected to a parallel-to-serial conversion by the parallel-to-serial converter 1009 on the basis of the phase offset of each signal block estimated by the phase offset estimating unit 1010.

The signal synthesizer 1012 synthesizes the received signals compensated the phase offset compensating units 1011 of the plurality of processors 1000.

Subsequently, an operation of the receiver device described with reference to FIG. 1 will be explained.

Firstly, at the receiver, the receiving units 1001-1 to 1001-R convert the R received signals inputted via R ports to baseband digital signals using an oscillating signal from the local oscillator 1014.

The timing detectors 1002-1 to 1002-R detect the signal positions of the signals outputted from the receiving units 1001-1 to 1001-R by using their preamble signals, and execute timing detection. That is, the timing detectors 1002-1 to 1002-R detect the signal position using the preamble signal for each input port, and execute timing detection.

The frequency offset compensating units 1003-1 to 1003-R use the preamble signals to estimate a frequency offset for the signals that were timing-detected, and compensate them.

Thereafter, the preamble signals are inputted to the weight calculators 1007-1 to 1007-R, which calculate equalization weights. Meanwhile, the data signals are subjected to a serial-to-parallel conversion by the serial-to-parallel converters 1004-1 to 1004-R, and to an FFT operation by the FFT operation units 1005-1 to 1005-R, obtaining frequency components of the received signals.

The equalizers 1006-1 to 1006-R equalize the frequency domains using weights calculated by the weight calculators 1007-1 to 1007-R. The IFFT operation units 1008-1 to 1008-R execute an IFFT transform, converting the signal to a time signal, and the parallel-to-serial converters 1009-1 to 1009-R execute a parallel-to-serial conversion.

The phase offset estimating units 1010-1 to 1010-R estimate the phase offset. The phase offset compensating units 1011-1 to 1011-R compensate the frequency or the phase offset based on the phase offset estimated by the phase offset compensating units 1011-1 to 1011-R.

The signals compensated in the processors 1000-1 to 1000-R of the corresponding ports are synthesized in the signal synthesizer 1012, and the received signal is demodulated in the demodulator 1013. Thus the receiver obtains a transmitted data sequence.

Figure 2:
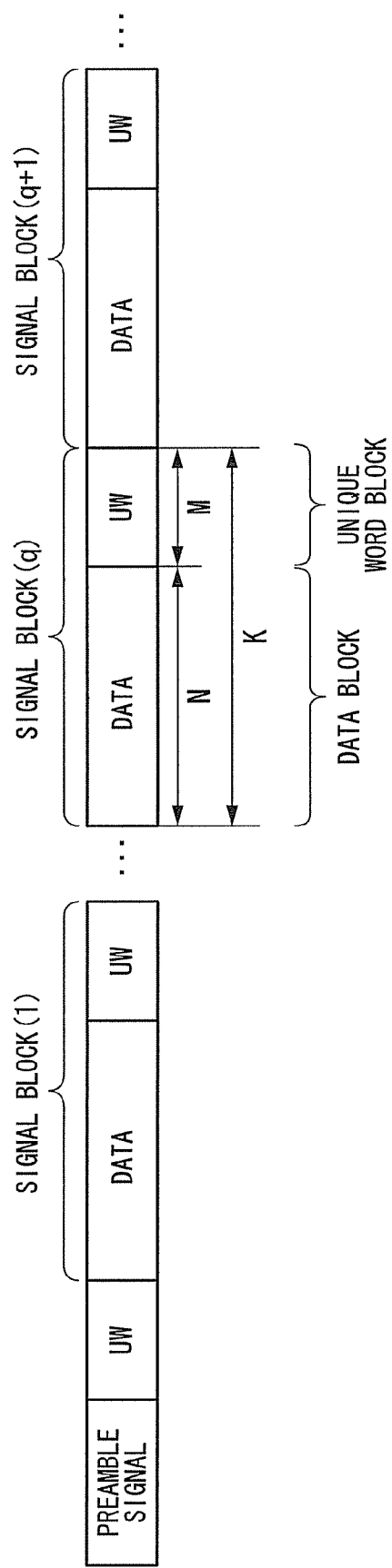
FIG. 2 is a diagram showing a transmitted signal received by the receiver device according to an embodiment of the invention.

One example of phase offset compensation executed by the phase offset estimating units 1010-1 to 1010-R and the phase offset compensating units 1011-1 to 1011-R will be explained. FIG. 2 is a block configuration of a transmitted signal received by the receiver device of this embodiment (see Reference Document 1 below).

[Reference Document 1]

L. Deneire, et al., "Training sequence versus cyclic prefix a new look on single carrier communication," IEEE Comun., Left., vol. 5, no. 7, pp. 1056-1060, 2000.

As shown in FIG. 2, the transmitter device 10 transmits a transmitted data sequence that is divided into N blocks with a unique word UW including M blocks inserted into it, creating a signal block having a total of K(=N+M) blocks.

The unique word UW is a predetermined signal, and is a known signal component. The unique word UW also serves as a guard interval GI for compensating arrival delay difference on the transmission path, such as path delay and wavelength dispersion. In generating the transmitted signal, the transmitter device also adds a preamble signal block containing a preamble signal to the head of the transmitted signal.

That is, the transmitted signal includes a preamble signal block containing a preamble signal at the head of the transmitted signal, and a plurality of signal blocks that come after this preamble signal block. Each signal block includes K blocks; the unique word UW includes M blocks of the K blocks and contains a unique word UW sequence of unique word information (signal); the remaining N blocks are data blocks containing a data sequence of transmitted data sequence information.

The receiver device receives the transmitted signal from the transmitter device 10 as a received signal, and the processors 1000-1 to 1000-R execute the processes such as FFT operation and frequency-domain equalization described above to the received signal for every signal block of K blocks, i.e. for every grouped unique word block and data block. Incidentally, the data signal described with reference to FIG. 1 corresponds to the signal containing the signal block described with reference to FIG. 2.

An operation of the phase offset estimating units 1010-1 to 1010-R and the phase offset compensating units 1011-1 to 1011-R will be explained.

To estimate the phase offset, the phase offset estimating units 1010-1 to 1010-R apply the abovementioned general equation $$\theta(q) = \arg\left\{\sum_{m=1}^{M} y(m, q)x(m)^*\right\}$$

to the device of this embodiment. That is, with respect to the output signals from the parallel-to-serial converters 1009-1 to 1009-R that follow the equalization of the received signal, the phase offset estimating units 1010-1 to 1010-R calculate the phase offset $\theta(r,q)$ on the basis of Equation 1 below, and perform an estimation.

[Equation 1]

$$\theta(r, q) = \arg\left\{\sum_{m=1}^{M} y(r, m, q)x(m)^*\right\} \quad (1)$$

Here, y(r,m,q) is an output signal from the parallel-to-serial converters 1009-r in the q-th signal block, and x(m) is a unique word UW sequence. The parameter m is an identification variable for sequentially identifying each unique word block of M blocks. Furthermore, * denotes a complex conjugate, and arg is a function for determining the angle.

The phase offset compensating units 1011-1 to 1011-R use the phase offset θ estimated from Equation 1, namely the phase offset θ(r,q) estimated in the q-th signal block and the phase offset θ(r,q−1) estimated in the (q−1)-th signal block, to execute a linear interpolation of the data sequence contained in the N blocks (data blocks) outputted from the parallel-to-serial converter 1009-r.

Thus the phase offset compensating units 1011-1 to 1011-R compensate the data sequence contained in the N blocks (data blocks) outputted from the parallel-to-serial converter 1009-r.

For example, the phase offset compensating units 1011-1 to 1011-R use the phase offset θ(r,q) estimated in the q-th signal block and the phase offset θ(r,q−1) estimated in the (q−1)-th signal block to execute a linear interpolation of the data sequence contained in the N blocks (data blocks) of the q-th signal block outputted from the parallel-to-serial converter 1009-r.

Thus, with respect to the q-th signal block, the phase offset compensating units 1011-1 to 1011-R compensate the phase offset of the data sequence contained in the N blocks (data blocks) outputted from the parallel-to-serial converter 1009-r.

While in the above explanation, the phase offset compensating units 1011-1 to 1011-R use the phase offset estimation values of two signal blocks and use linear interpolation to execute interpolation of the data sequence contained in one signal block, the invention is not limited to this configuration. For example, the phase offset compensating units 1011-1 to 1011-R can use the phase offset estimation value of all signal blocks to the front and rear, a total of Q signal blocks, and compensate the phase offset by executing a $C(C \leqq Q)$-order interpolation to interpolate the data sequence contained in one signal block.

Furthermore, while in the above explanation, the transmitted data sequence is divided into N blocks with a unique word UW including M block inserted into it, creating a signal block having a total of K(=N+M) blocks, the invention is not limited to this configuration; for example, the signal block can be created in the following manner.

After first dividing each transmitted data sequence into N blocks, the Ng block at the tail end of each block can be copied as a guard interval GI and inserted at the head of each of the corresponding block, thereby creating a signal block with a total of (N+Ng) blocks (see Reference Document 2 below). In this case, the Ng block at the tail end of each block that is copied as the guard interval GI corresponds to the unique word mentioned above.

[Reference Document 2]

D. Falconer, et al., "Frequency domain equalization for single-carrier broadband wireless systems," IEEE Commun. Mag., vol. 40, no. 4, pp. 58-66, April 2002.

In this case, the phase offset estimating units 1010-1 to 1010-R and the phase offset compensating units 1011-1 to 1011-R can compensate the phase offset by using doubling method or quadrupling method to blindly execute offset compensation.

[Reference Document 2]

S. J. Savory, et al., "Electronic compensation of chromatic dispersion using a digital coherent receiver," Optics express, vol. 15, no. 5, pp. 2120-2126, March 2007.

The unique word can be a predetermined signal, or a signal obtained by copying the Ng block at the tail end of each block in the manner described above. That is, the unique word can be a signal that the receiver device can detect in each signal block.

The unique word can also be, for example, a guard interval.

While the explanation of FIG. 1 uses the FFT operation units 1005-1 to 1005-R and the IFFT operation units 1008-1 to 1008-R, this configuration can use orthogonal transformers and inverse orthogonal transformers such as discrete Fourier transformers and inverse discrete Fourier transformers.

While in the above explanation it is assumed that the receiver device receives a signal by single-access transmission from a single station, the receiver device of this embodiment can be used in transmissions from a plurality of stations, and can be used when each station transmits a plurality of transmitted signals.

In the receiver device, the received signal is received by oversampling multiplied by Ns, and this Ns-oversampled signal which has been analog-to-digital converted can be received in the manner described above. For example, at the receiver device, the receiving units 1001-1 to 1001-R receive the received signal after performing oversampling multiplied by Ns.

In this case, to estimate the phase offset, the phase offset estimating units 1010-1 to 1010-R apply the abovementioned general equation $$\theta(q) = \arg\left\{\sum_{m=1}^{M} y(m,q)x(m)^*\right\}$$

to the device having such a configuration. That is, the phase offset estimating units 1010-1 to 1010-R calculate the phase offset θ' from equation (2) below.

[Equation 2]

$$\theta'(r,q) = \arg\left\{\sum_{m=1}^{N_s M} y'(r,m,q)x'(m)^*\right\} \quad (2)$$

Here, y'(r,m,q) represents the output signal from the parallel-to-serial converter 1009-r in the q-th signal block obtained by oversampling multiplied by Ns, and x'(m) represents a unique word UW sequence expressed by oversampling multiplied by Ns. The parameter m is an identification variable for sequentially identifying each unique word block of Ns×M blocks that were subjected to oversampling multiplied by N. Furthermore, * denotes a complex conjugate, and arg is a function for determining the angle.

On the basis of the phase offset θ' calculated by the phase offset estimating units 1010-1 to 1010-R from Equation (2), the phase offset compensating units 1011-1 to 1011-R compensate the phase offset of (Ns×N) transmitted data sequences outputted from the parallel-to-serial converter 1009-r, in the same manner as the phase offset θ calculated by the phase offset estimating units 1010-1 to 1010-R from the Equation (1).

While in the above explanation, the receiver device was a receiving system in single-carrier transmission, it can be similarly applied in multi-carrier transmission.

While in the above explanation, the configuration of the receiver device is based on frequency-domain equalization, the invention can also be applied when using time-domain equalization using a tapped delay filter.

In the above explanation, the unique word UW sequence can be, for example, a PN sequence or a Chu sequence (see Reference Document 4).

[Reference Document 4]

D. C. Chu, "Polyphase codes with good periodic correlation properties," IEEE Trans. Inf. Theory, Vol. 5, NO. 7, pp. 531-532, July 1972.

As described above, in the receiver device according to the first embodiment, signals inputted to a plurality of ports, i.e. signals received at a plurality of antenna elements, are subjected to phase offset compensation using known signal components (unique words) contained in a signal equalized in the frequency domain. This makes it possible to compensate complex phase offset fluctuation. Moreover, the phase offset of each signal obtained at each receive port is estimated. Thus, even when there is temporal phase offset instability or fluctuation, or when the phase offsets of the receive ports do not match, the phase offsets can be compensated and the transmitted data sequence can be received.

Second Embodiment

Figure 3:
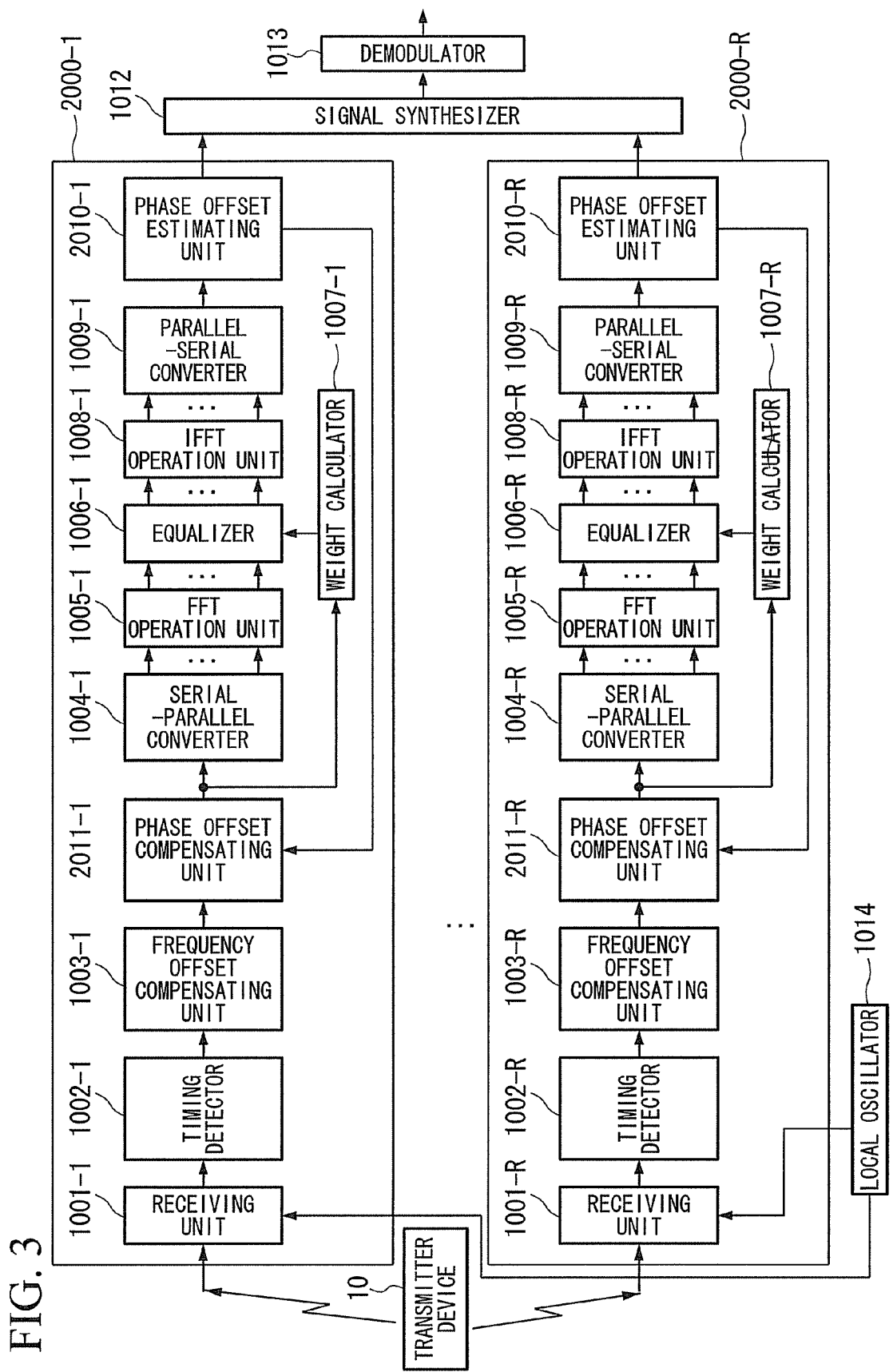
FIG. 3 is a block diagram showing a receiver device according to a second embodiment of the invention.

Subsequently, the configuration of a receiver device according to a second embodiment will be explained with reference to FIG. 3. In FIG. 3, portions corresponding to those in FIG. 1 are designated with like reference numerals and are not repetitiously explained. Processors 2000-1 to 2000-R in FIG. 3 correspond to the processors 1000-1 to 2000-R in FIG. 1.

In FIG. 3, the configuration of phase offset estimating units 2010-1 to 2010-R is the same as the configuration of the phase offset estimating units 1010-1 to 1010-R described with reference to FIG. 1. Also, the configuration of the phase offset compensating units 2011-1 to 2011-R is the same as the configuration of the phase offset compensating units 1011-1 to 1011-R described with reference to FIG. 1. The phase offset estimating units 1010-1 to 1010-R and the phase offset compensating units 2011-1 to 2011-R are arranged on a received signal conversion path that runs from timing detectors 1002-1 to 1002-R to a demodulator 1013.

The configuration of the receiver device in the first embodiment shown in FIG. 1 and the configuration of the receiver device in the second embodiment shown in FIG. 2 differ in regard to the following points.

Firstly, in the receiver device of the first embodiment, on the basis of the phase offset estimated by the phase offset estimating units 1010-1 to 1010-R, the phase offset compensating units 1011-1 to 1011-R compensate the received signal that was subjected to a parallel-to-serial conversion by the parallel-to-serial converters 1009-1 to 1009-R, and output the compensated received signal to the signal synthesizer 1012.

In contrast, in the receiver device of the second embodiment, the phase offset compensating units 2011-1 to 2011-R are arranged in a stage following the frequency offset compensating units 1003-1 to 1003-R. On the basis of the phase offset estimated by the phase offset estimating units 2010-1 to 2010-R, the phase offset compensating units 2011-1 to 2011-R compensate the received signal that was compensated by the frequency offset compensating units 1003-1 to 1003-R, and output this compensated received signal to the serial-to-parallel converters 1004-1 to 1004-R.

Furthermore, in the receiver device of the first embodiment, the received signals compensated by the phase offset compensating units 1011-1 to 1011-R are output to the signal synthesizer 1012.

In contrast, in the receiver device of the second embodiment, the received signals subjected to parallel-to-serial conversion by the parallel-to-serial converters 1009-1 to 1009-R are output to the signal synthesizer 1012. Incidentally, while in this explanation, the received signals subjected to parallel-to-serial conversion by the parallel-to-serial converters 1009-1 to 1009-R are output directly to the signal synthesizer 1012, they can be output via the phase offset estimating units 1010-1 to 1010-R to the signal synthesizer 1012.

Subsequently, two operations of the receiver device in the second embodiment will be explained. Operations that are similar to those of the receiver device in the first embodiment will not be repetitiously explained.

A first operation will be explained. The phase offset compensating units 2011-1 to 2011-R use the unique word UW (Equation 1) to estimate an phase offset for the q-th signal block in output signals from the parallel-to-serial converters 1009-1 to 1009-R that were subjected to frequency-domain equalization and parallel-to-serial conversion. The phase offset compensating units 2011-1 to 2011-R then feed back information relating to the estimated phase offsets to the phase offset compensating units 2011-1 to 2011-R of the corresponding ports.

On the basis of the phase offset corresponding to the q-th signal block fed back, the phase offset compensating units 2011-1 to 2011-R execute phase offset compensation with respect to the received signals compensated by the frequency offset compensating units 1003, i.e. the (q+1)-th received signal prior to frequency-domain equalization.

That is, in this case, the receiver device estimates the phase offset of the (q+1)-th signal block from the information relating to the q-th signal block, and compensates the phase offset of the (q+1)-th signal block. This process is suitable for online processing.

Subsequently, a second operation will be explained. The phase offset compensating units 2011-1 to 2011-R use the unique word UW (Equation 1) to estimate an phase offset for the q-th signal block in output signals from the parallel-to-serial converters 1009-1 to 1009-R that were subjected to frequency-domain equalization and parallel-to-serial conversion. The phase offset compensating units 2011-1 to 2011-R then feed back information relating to the estimated phase offsets to the phase offset compensating units 2011-1 to 2011-R of the corresponding ports.

On the basis of the phase offset corresponding to the q-th signal block fed back, the phase offset compensating units 2011-1 to 2011-R compensate the phase offset of the q-th received signal prior to frequency-domain equalization. Thereafter, the equalization process is executed again to the received signal that was phase offset-compensated by the phase offset compensating units 2011-1 to 2011-R, whereby the quality of the signal contained in the q-th signal block can be enhanced.

That is, in this case, the receiver device estimates the phase offset of the q-th signal block from the information relating to the q-th signal block, and compensates the phase offset of the q-th signal block. This process is suitable for online processing.

In the case of the receiver device that executes the second operation described above, the configuration of this receiver device further includes a frequency offset-compensated received signal storage unit that stores received signals compensated by the frequency offset compensating unit 1003. The receiver device operates, for example, in the following manner.

When the frequency offset compensating unit 1003 compensates the phase offset of a received signal whose signal position was detected by the timing detector 1002, the compensated received signal is outputted to the phase offset compensating units 2011-1 to 2011-R, and stored in the frequency offset-compensated received signal storage unit.

When, on the basis of the phase offset corresponding to the q-th signal block fed back, the phase offset compensating units 2011-1 to 2011-R compensate the phase offset of the q-th received signal prior to frequency-domain equalization, they read the received signal from the frequency offset-compensated received signal storage unit, and compensate the phase offset of the received signal that was read on the basis of the phase offset corresponding to the q-th signal block fed back. This enables the receiver device to execute the second operation described above.

By performing the first and the second operations described above, the receiver device of the second embodiment, in similar manner to the receiver device of the first embodiment, uses a known signal component (unique word) contained in a frequency-domain equalized signal to compensate the phase offset, thereby compensating complex phase offset fluctuation, and estimating the phase offset of each signal obtained at each receive port; thus, even when there is temporal phase offset instability or fluctuation, or when the phase offsets of the receive ports do not match, the phase offsets can be compensated and the transmitted data sequence can be received.

Furthermore, destruction of the orthogonal feature between FTT blocks due to phase offset can also be compensated.

Third Embodiment

Figure 4:
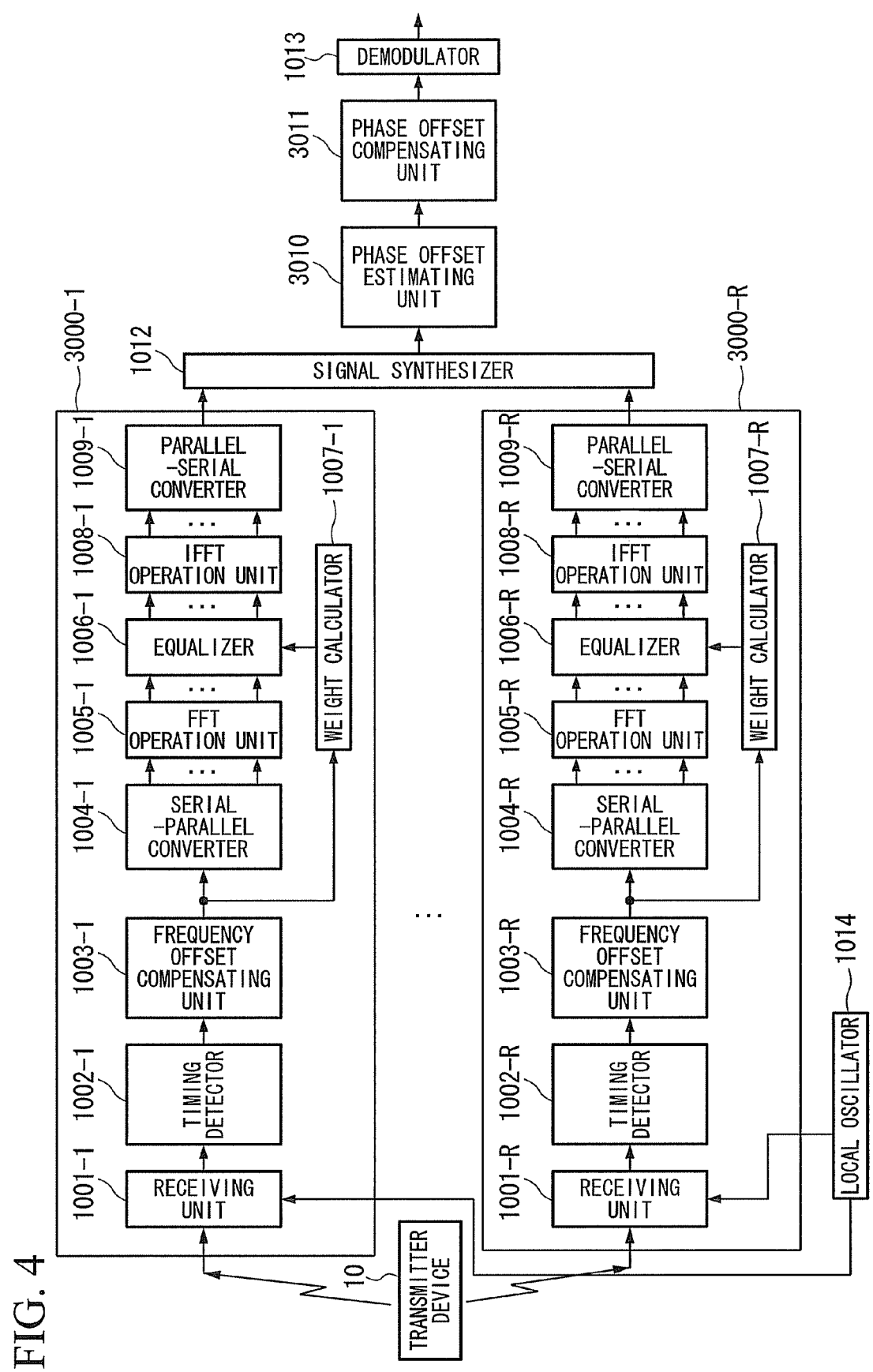
FIG. 4 is a block diagram showing a receiver device according to a third embodiment of the invention.

Subsequently, the configuration of a receiver device according to a third embodiment will be explained with reference to FIG. 4. In FIG. 4, portions corresponding to those in FIG. 1 and FIG. 3 are designated with like reference numerals and are not repetitiously explained. Processors 3000-1 to 3000-R in FIG. 4 correspond to the processors 1000-1 to 1000-R in FIG. 1 and the processors 2000-1 to 2000-R in FIG. 3.

In FIG. 4, the configuration of a phase offset estimating unit 3010 is the same as one of the phase offset estimating units 1010-1 to 1010-R explained with reference to FIG. 1 and the phase offset estimating units 2010-1 to 2010-R explained with reference to FIG. 3. Also, the configuration of a phase offset compensating unit 3011 is the same as one of the phase offset compensating units 2011-1 to 2011-R explained with reference to FIG. 1 and the phase offset compensating units 2011-1 to 2011-R explained with reference to FIG. 3. The phase offset estimating unit 3010 and the phase offset compensating unit 3011 are arranged on a received signal conversion path that runs from timing detectors 1002-1 to 1002-R to a demodulator 1013.

The configuration of the receiver device of the first embodiment shown in FIG. 1 and the configuration of the receiver device of the third embodiment shown in FIG. 4 differ in regard to the following points.

In the receiver device of the first embodiment, the phase offset estimating units 1010-1 to 1010-R estimate the phase offset on the basis of the received signal that is subjected to parallel-to-serial conversion by the parallel-to-serial converters 1009-1 to 1009-R. Furthermore, the phase offset compensating units 2011-1 to 2011-R compensate the received signal subjected to parallel-to-serial conversion by the parallel-to-serial converters 1009-1 to 1009-R on the basis of the open/close state estimated by the phase offset estimating units 1010-1 to 1010-R.

In contrast, in the receiver device of the third embodiment, the phase offset estimating unit 3010 is arranged in a stage following the signal synthesizer 1012. The phase offset estimating unit 3010 estimates the phase offset of the basis of the received signal synthesized by the signal synthesizer 1012. The phase offset compensating unit 3011 is arranged in a stage following the phase offset estimating unit 3010. The phase offset compensating unit 3011 compensates the received signal synthesized by the signal synthesizer 1012 on the basis of the phase offset estimated by the phase offset estimating unit 3010.

Furthermore, in the receiver device of the first embodiment, the signal synthesizer 1012 synthesizes received signals compensated by the phase offset compensating units 1011 of the plurality of processors 1000.

In contrast, in the receiver device of the third embodiment, the signal synthesizer 1012 synthesizes received signals that were subjected to parallel-to-serial conversion by the parallel-to-serial converters 1009-1 to 1009-R.

That is, the receiver device according to the first embodiment includes, at each port, a group of the phase offset estimating units 1010-1 to 1010-R and the phase offset compensating units 1011-1 to 1011-R for the received signal of each port. In contrast, the receiver device according to the third embodiment includes one group of the phase offset estimating unit 3010 and the phase offset compensating unit 3011 for a signal obtained by synthesizing the received signal of each port.

The phase offset estimating unit 3010 uses the abovementioned general $$\text{equation } \theta(q) = \arg\left\{\sum_{m=1}^{M} y(m, q)x(m)^*\right\}$$

to estimate the phase offset of the output signal synthesized by the signal synthesizer 1012.

The receiver device according to the third embodiment described above obtains similar effects to the receiver devices of the first and the second embodiments.

Fourth Embodiment

Figure 5:
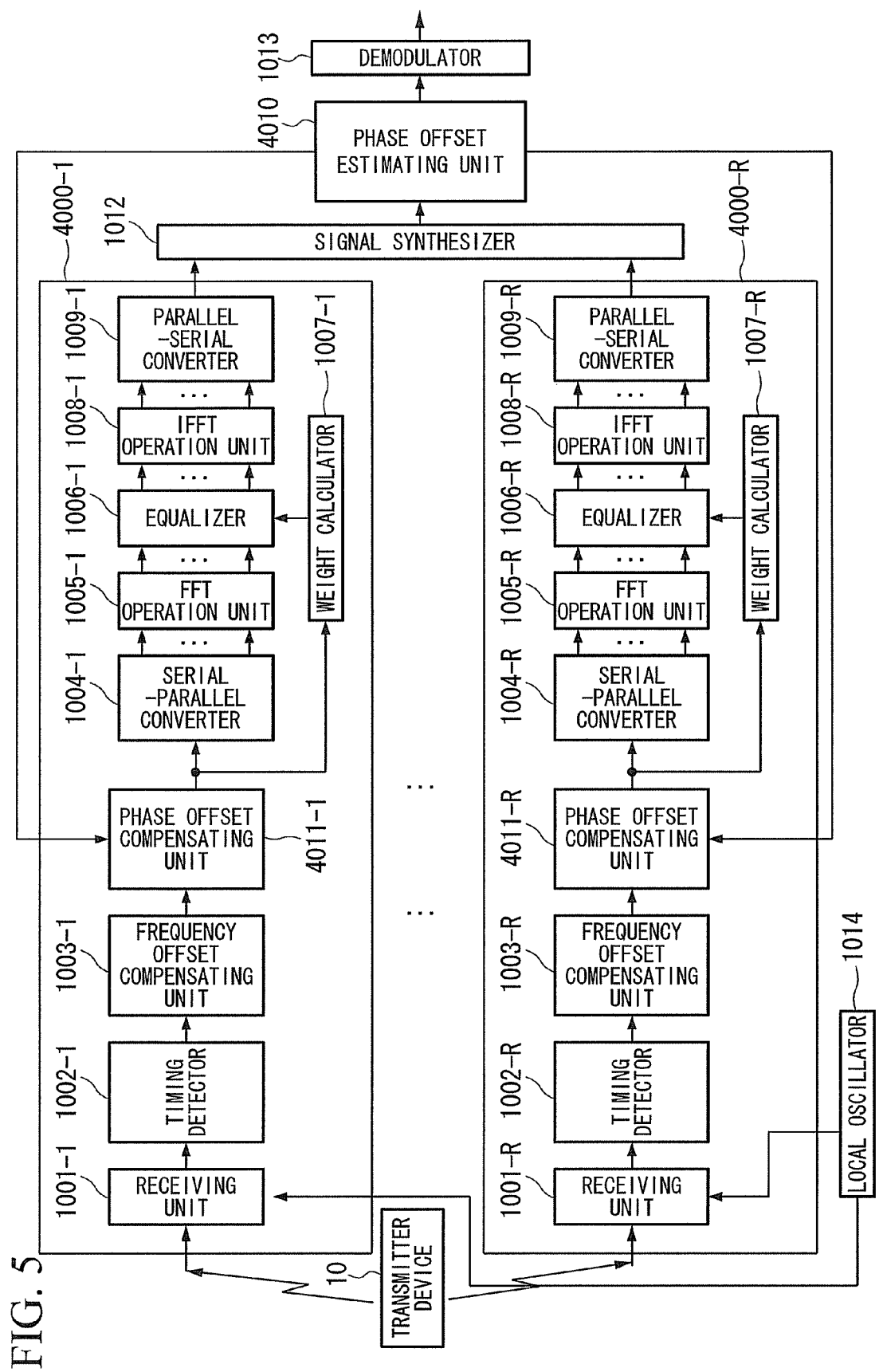
FIG. 5 is a block diagram showing a receiver device according to a fourth embodiment of the invention.

Subsequently, a receiver device according to a fourth embodiment will be explained with reference to FIG. 5. In FIG. 5, portions corresponding to those in FIGS. 1, 3 and 4 are designated with like reference numerals and are not repetitiously explained. Processors 4000-1 to 4000-R of this embodiment correspond to the processors 1000-1 to 1000-R in FIG. 1, the processors 2000-1 to 2000-R in FIG. 3, and the processors 3000-1 to 3000-R in FIG. 4.

In FIG. 5, the configuration of a phase offset estimating unit 4010 is the same as the configuration of the phase offset estimating unit 3010 explained with reference to FIG. 4. The configuration of phase offset compensating units 4011-1 to 4011-R is the same as the phase offset compensating units 1011-1 to 1011-R explained with reference to FIG. 1 and the phase offset compensating units 2011-1 to 2011-R explained with reference to FIG. 3. The phase offset estimating unit 4010 and the phase offset compensating units 4011-1 to 4011-R are arranged on a received signal conversion path that runs from timing detectors 1002-1 to 1002-R to a demodulator 1013.

Subsequently, points of difference between the configuration of the receiver device in the second embodiment shown in FIG. 3 and the configuration of the receiver device in the fourth embodiment shown in FIG. 5 will be explained.

In the second embodiment, the phase offset estimating units 2010-1 to 2010-R estimate the phase offset on the basis of the received signal subjected to a parallel-to-serial conversion by the parallel-to-serial converters 1009-1 to 1009-R. On the basis of the phase offset estimated by the phase offset estimating units 1010-1 to 1010-R corresponding to the port, the phase offset compensating units 2011-1 to 2011-R compensate the phase offset, and output the compensated received signal to the serial-to-parallel converters 1004-1 to 1004-R.

In contrast, in the receiver device in the fourth embodiment, as in the third embodiment, the phase offset estimating unit 4010 is provided at a stage following the signal synthesizer 1012. On the basis of the received signal synthesized by the signal synthesizer 1012, the phase offset estimating unit 4010 estimates the phase offset. Each of the phase offset compensating units 4011-1 to 4011-R is provided in a stage later than the respective frequency offset compensating units 1003-1 to 1003-R. On the basis of the phase offset estimated by the phase offset estimating unit 4010, the phase offset compensating units 4011-1 to 4011-R compensate the received signal compensated by the frequency offset compensating units 1003-1 to 1003-R, and output the compensated received signal to the serial-to-parallel converters 1004-1 to 1004-R.

In the receiver device according to the fourth embodiment, the phase offset estimating unit 4010 estimates the phase offset on the basis of a signal obtained by synthesizing the received signal of each port. That is, the phase offset estimating unit 4010 estimates the phase offset of the output signal synthesized by the signal synthesizer 1012 using the above-mentioned general equation $$\theta(q) = \arg\left\{\sum_{m=1}^{M} y(m, q)x(m)^*\right\}.$$

On the basis of this estimated phase offset, the phase offset compensating units 4011-1 to 4011-R compensate the received signal compensated by the frequency offset compensating units 1003-1 to 1003-R at each port.

The receiver device according to the fourth embodiment obtains the same effects as the receiver devices of the first to the third embodiments.

Subsequently, the configuration of frequency offset compensating units 1003-1 to 1003-R in the receiver device according to the first embodiment to the fourth embodiment will be explained with reference to FIG. 6.

Figure 6:
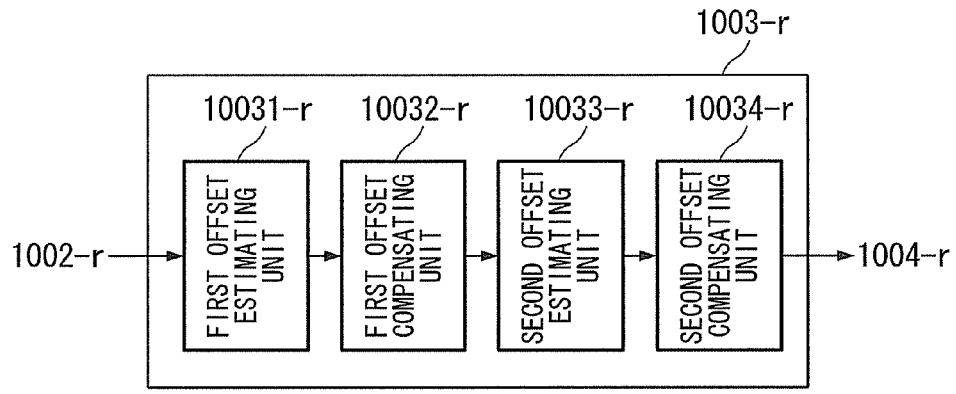
FIG. 6 is a block diagram showing a frequency offset compensating unit in the receiver device according to the first to the fourth embodiments of the invention.

In FIG. 6, the frequency offset compensating unit 1003-r (r=1 to R) includes a first offset estimator (first frequency offset estimating unit) 10031-r, a first offset compensating unit (first frequency offset compensating unit) 10032-r, a second offset estimator (second frequency offset estimating unit) 10033-r, and a second offset compensating unit (second frequency offset compensating unit) 10034-r.

Figure 7:
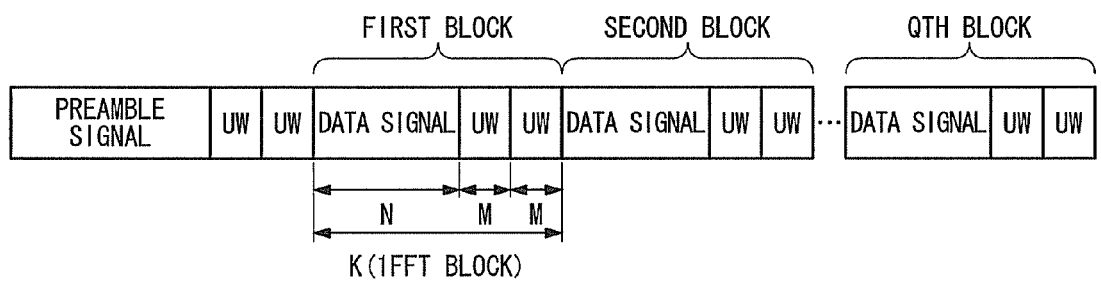
FIG. 7 is a first configuration diagram showing a transmitted signal used in the frequency offset compensating unit shown in FIG. 6.

One example of the frame configuration of a transmitted signal in this embodiment will be explained with reference to FIG. 7. As shown in FIG. 7, the transmitted signal is formed from an alternate arrangement of a time-multiplexed preamble signal followed by 2M unique words UW (one M per unique word UW1) repeated twice and N data signals (see Reference Documents 1 and 2). That is, each signal block of the received signal that the receiver device according to this embodiment receives contains a preamble signal, a plurality of unique words UW, and data signals.

In the frequency offset compensating unit 1003-r (r=1 to R) of FIG. 6, the first frequency offset estimating unit 10031-r uses the preamble signal contained in the received signal that was timing-detected by the timing detector to calculate an estimated value of the first frequency offset.

The first offset compensating unit 10032-r uses the estimated value of the first frequency offset calculated by the first frequency offset estimating unit 10031-r to compensate the frequency offset of the received signal that was timing-detected by the timing detector.

The second offset estimating unit 10033-r uses the plurality of unique words contained in the received signal that was compensated by the first offset compensating unit 10032-r to calculate an estimated value of a second frequency offset.

The second offset compensating unit 10034-r uses the estimated value of the second frequency offset calculated by the second offset estimating unit 10033-r to compensate the frequency offset of the received signal whose frequency offset was compensated by the first offset compensating unit 10032-r.

Subsequently, an operation of the frequency offset compensating unit 1003-r will be explained. On the receiving side, a time-multiplexed preamble signal is used to compensate the frequency offset in the following manner.

At port no. r, the first offset estimating unit 10031-r calculates a frequency offset estimated value. As in a conventional method, the frequency offset can be estimated by calculating the cross correlation between a preamble signal and a transmitted pilot signal.

The calculated frequency offset estimated value is input as an input value to the first offset compensating unit 10032-r, which compensates the offset.

The offset-compensated received data signal outputted from the first offset compensating unit 10032-r is then inputted to the second offset estimating unit 10033-r and the second offset compensating unit 10034-r.

The second offset estimator 10033-r inputs the frequency-compensated received data signal from the first offset compensating unit 10032-r, and uses the unique word UW portion of the received data signal to calculate an estimated value of the frequency offset. As one example, the Equation 3 below expresses a calculation method of determining the time correlation between the received signal of the unique word UW and the transmitted signal.

[Equation 3]

$$\theta(r, q) = \arg\left\{\sum_{m=1}^{M} y(r, K - M + m, q)x(m)^*\right\} \quad (3)$$

Here, y(r,m,q) represents the output signal from the first offset compensating unit 10032-r in the q-th block, and x(m) represents the unique word UW sequence. Also, * denotes a complex conjugate, and arg is a function for determining the angle.

Using the phase offset θ(r,q) estimated in the q-th block as in Equation 3, and the phase offset θ(r,q−1) estimated in the block immediately before that, i.e. in the (q−1)-th block, first-order linear interpolation is performed, and the frequency offsets of K received data signals outputted from the first offset compensating unit 10032-r are compensated.

By this process, on the receiving side, the first unique word UW serves as the guard interval GI for the second unique word UW. Therefore, even on a transmission path suffering from problems such as delay dispersion and wavelength dispersion, the unique words UW can be used to compensate the frequency offset of each block. This makes it possible to restore orthogonal feature between blocks that was destroyed due to frequency offset, and to make a highly precise signal determination.

Furthermore, since it is no longer necessary to cyclically insert a pilot to compensate the frequency offset, the transmission efficiency does not decline.

While in the above explanation, frequency offset estimated values of two blocks are used in executing first-order linear interpolation, C-order interpolation (where C≦Q) can be executed using front and rear Q blocks.

Figure 8:
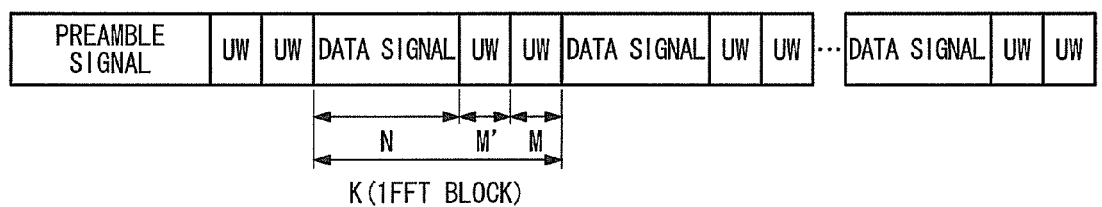
FIG. 8 is a second configuration diagram showing a transmitted signal used in the frequency offset compensating unit shown in FIG. 6.

While in the above explanation, the number of repeated unique words UW is the same, they can be different numbers (M'≦M) as shown in FIG. 8.

While in the above explanation, the transmitted data sequence is created by inserting two unique words UW of M blocks, obtaining a total of K(=N+2 M) blocks, it is also possible to insert B unique words UW (where B is an arbitrary integer), obtaining a total of K=N+BM blocks.

For example, the frequency offset value when B unique words UW are inserted is estimated from the following Equation 4.

[Equation 4]

$$\hat{\theta}(r, q, b) = \arg\left\{\sum_{m=1}^{M} y(r, K - bM + m, q)x(m)^*\right\} \quad (4)$$

Here, the frequency offset of the data signal can be compensated by using the (B−1) frequency offset estimated values $\hat{\theta}(r,q,b)$ obtained from Equation 4 to execute D-order interpolation (D≦B−1). Variable b is an integer having a value of 1 to B−1. Furthermore, * denotes a complex conjugate, and arg is a function for determining the angle.

Furthermore, an estimated value of the frequency offset can be obtained by averaging correlation values obtained from B−1 unique words UW in Equation 5 below.

[Equation 5]

$$\hat{\theta}'(r, q) = \arg\left\{\sum_{b=1}^{B-1}\sum_{m=1}^{M} y(r, K - bM + m, q)x(m)^*\right\} \quad (5)$$

If the frequency offset is estimated according to this Equation 5, in comparison with the estimated value θ(r,q) when two unique words UW are inserted, noise and interference component can be reduced, making it possible to obtain a highly precise estimated value for the frequency offset. Incidentally, * denotes a complex conjugate, and arg is a function for determining the angle.

The method described above can similarly be used when oversampling is performed to obtain an Ns-oversampled signal which has been analog-to-digital converted. In this case, the phase offset can be calculated from Equation 6 below.

[Equation 6]

$$\theta'(r, q) = \arg\left\{\sum_{m=1}^{N_s M} y'(r, N_s K - N_s M + m, q)x'(m)^*\right\} \quad (6)$$

Here, y'(r,m,q) represents an output signal from the first offset compensating unit 10032-r in the q-th block obtained by oversampling multiplied by Ns, and x'(m) represents a unique word UW sequence expressed in oversampling multiplied by Ns. Furthermore, * denotes a complex conjugate, and arg is a function for determining the angle.

While in the above explanation, the configuration of the receiver device is based on frequency-domain equalization, the invention can also be applied when using time-domain equalization using a tapped delay filter.

In the above explanation, the unique word UW sequence can be, for example, a PN sequence or a Chu sequence (see Reference Document 4).

Incidentally, while in the above explanation, the frequency offset is estimated and compensated at each port, when the frequency offsets are the same at all the ports, the estimation precision can be increased by averaging the estimated values for the frequency offsets of all the ports.

Even when the frequency is unstable or the frequency offsets of the receive ports do not match, the frequency offset compensating unit 1003-r (r=1 to R) explained using FIGS. 6 to 8 re-compensates any frequency offset that cannot be fully compensated with a time-multiplexed preamble signal in each block at each port, prior to using a unique word UW functioning as a guard interval GI for equalization.

In the explanation of the frequency offset compensating unit 1003-r (r=1 to R) using FIGS. 6 to 8, each signal block includes a plurality of unique words for use as the unique word UW. When each signal block includes a plurality of unique words in this manner, each of the phase offset estimating units 1010-1 to 1010-R, the phase offset estimating units 2010-1 to 2010-R, the phase offset estimating unit 3010, and the phase offset estimating unit 4010 in the first embodiment to the fourth embodiment estimate the phase offset on the basis of one predetermined arbitrary unique word UW from among the plurality of unique words.

This method is not limited to the use of one arbitrary unique word UW, and it is possible to estimate the phase offset on the basis of a plurality of predetermined unique words UW or all the unique words UW.

Fifth Embodiment

Subsequently, a configuration wherein the receiver device for wireless transmission according to one of the first to the fourth embodiments is applied to optical transmission will be explained.

As explained below, in optical transmission, the number of ports R is the number of polarization waves having a predetermined angle in the electromagnetic field.

The difference between wireless transmission and optical transmission is the configuration of the receiving unit 1001. Also, the local oscillator 1014 is changed to a local oscillator 2014.

In applying the receiver device that executes wireless transmission according to one of the first to the fourth embodiments to optical transmission, when using a 90 degree polarization-diversity hybrid coupler, the receiver device inputs two input signals, one X-polarization wave and one Y-polarization wave. That is, the receiver device for optical transmission has a configuration that corresponds to the receiving units 1001-1 to 2 (receiving unit 2001 described below).

This receiver device has a configuration that corresponds to the processors 1000-1 to 2, the processors 2000-1 to 2, the processors 3000-1 to 2, and the processors 4000-1 to 2.

Figure 9:
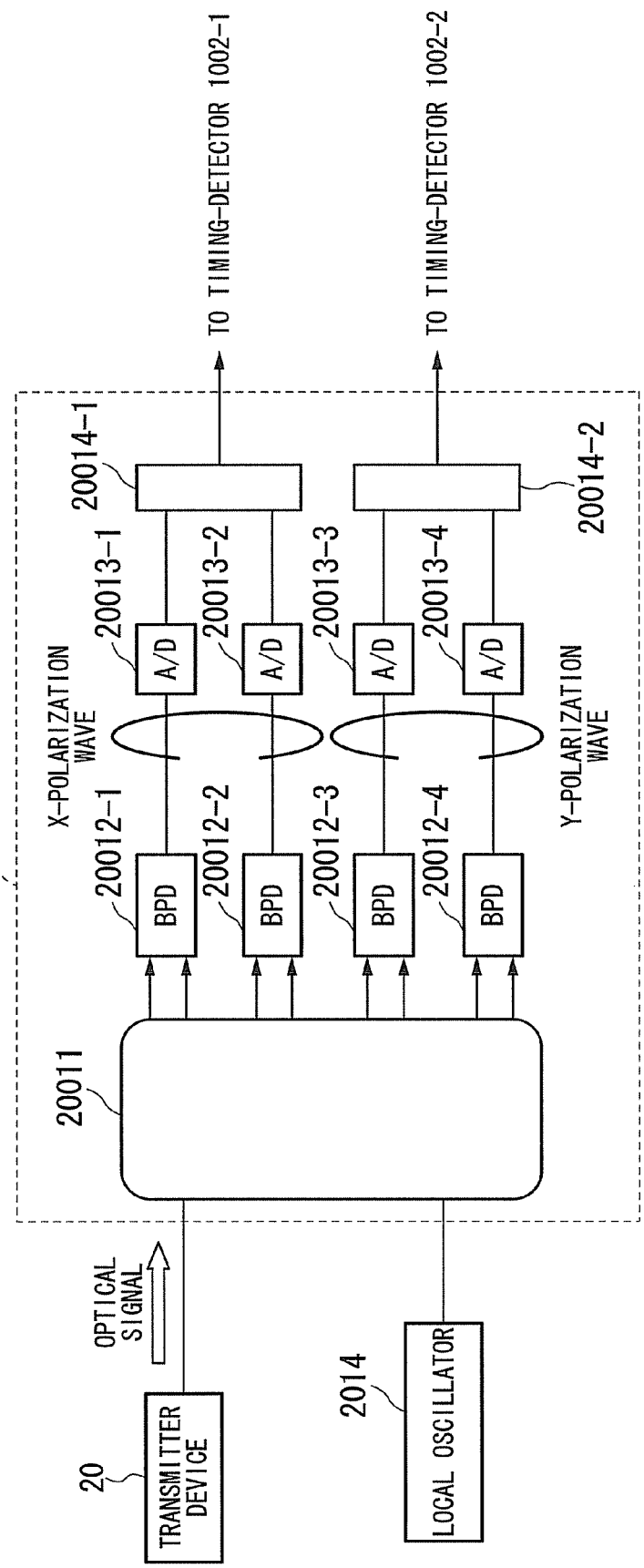
FIG. 9 is a block diagram showing a receiver device according to a fifth embodiment of the invention.

With reference to FIG. 9, the configuration of a receiving unit 2001 will be explained as an example corresponding to the receiving unit 1001-1 to 2 of FIGS. 1, 3, 4 and 5.

In the receiving unit 2001, transmitter device 20 transmits an optical signal along an optical channel, and a 90 degree polarization-diversity hybrid coupler 20011 mixes the optical signal with a local oscillating light source oscillated from a local oscillator 2014. The optical signal then passes through balanced photodiodes (BPD) 20012-1 to 4, whereby it is converted to four baseband analog signals, namely I-phase and Q-phase of the X-polarization wave and I-phase and Q-phase of the Y-polarization wave.

The baseband analog signals are converted to digital signals by respective A/D converters 20013-1 to 4. Digital signals corresponding to the I-phase and the Q-phase of the X-polarization wave outputted from the A/D converters 20013-1 to 2 are then processed as the real part and the imaginary part of a complex number with respect to the X-polarization wave.

Specifically, the digital signals corresponding to the I-phase and the Q-phase of the X-polarization wave outputted from the A/D converters 20013-1 to 2 pass via a complex signalizing unit 20014-1, and are inputted to the timing detector 1002-1 of the receiver device according to one of the first to the fourth embodiments described with reference to FIGS. 1, 3, 4 and 5.

In the same manner as the X-polarization wave, digital signals corresponding to the I-phase and the Q-phase of the Y-polarization wave outputted from the A/D converters 20013-3 to 4 are then processed as the real part and the imaginary part of a complex number with respect to the Y-polarization wave.

Specifically, the digital signals corresponding to the I-phase and the Q-phase of the Y-polarization wave outputted from the A/D converters 20013-3 to 4 pass via a complex signalizing unit 20014-2, and are inputted to the timing detector 1002-2 of the receiver device according to any one of the first to the fourth embodiments described with reference to FIGS. 1, 3, 4 and 5.

The signal processing from the timing detectors 1002-1 to 2 onwards is the same in both optical transmission and wireless transmission, and therefore will not be repetitiously explained. That is, the operation of the receiver device according to the fifth embodiment is the same as the operation of the receiver device in any one of the first to the fourth embodiments.

Incidentally, the balanced photodiodes (BPD) 20012-1 to 4 described above can be replaced with single-ended photodiodes (PD).

While the above explanation describes a case where a 90 degree polarization-diversity hybrid coupler 20011 is used to obtain two polarization waves X and Y that are orthogonal to each other, the receiver device according to the fifth embodiment is not limited to this configuration. For example, instead of the 90 degree polarization-diversity hybrid coupler 20011, a hybrid coupler having a predetermined arbitrary polarization-diversity other than 90 degrees can be used. In that case, the polarization waves have a predetermined arbitrary angle in the electromagnetic field.

Moreover, when the number of ports is increased to three or more, a polarization diversity effect can be achieved even if the orthogonal polarization is lost.

The receiver device according to the fifth embodiment receives a signal inputted to a plurality of ports, i.e. a plurality of divided polarization waves (e.g. X-polarization wave and Y-polarization wave) as a plurality of received signals, and, in the same manner as the first to the fourth embodiments, compensates their phase offsets by using known signal components (unique words) contained in the equalized frequency-domain signal. This makes it possible to compensate complex phase offset fluctuation, and estimate the phase offset of the signal obtained at each receive port. Therefore, even when there is temporal phase offset instability or fluctuation, or when the phase offsets of the receive ports do not match, the phase offsets can be compensated and the transmitted data sequence can be received.

Figure 10:
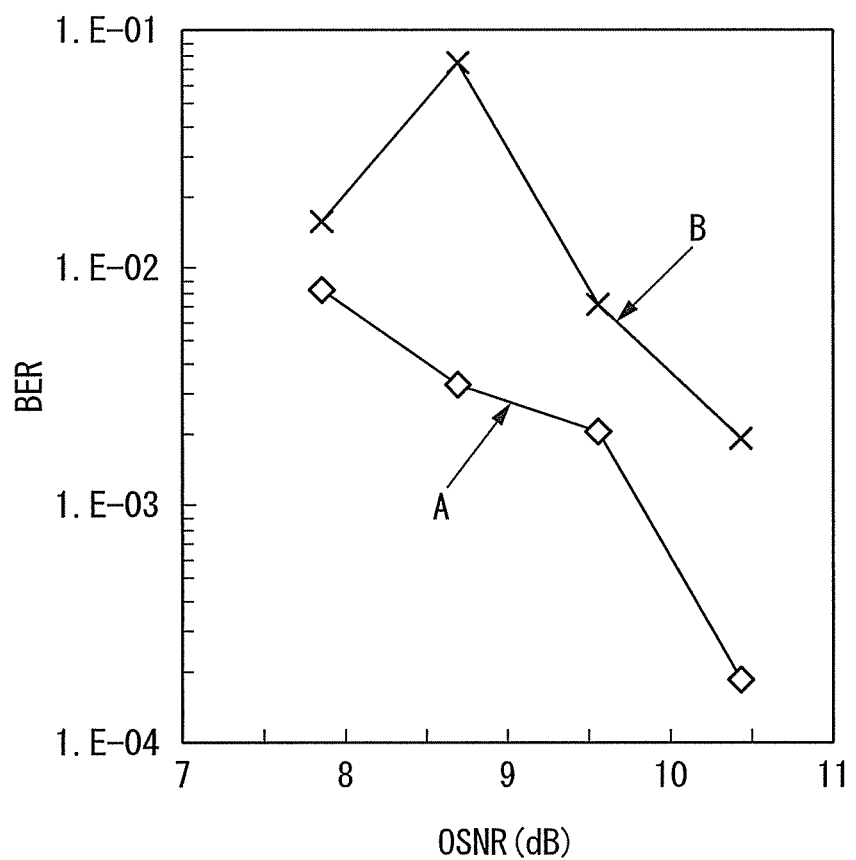
FIG. 10 is a graph showing reception characteristics of the receiver device according to the fifth embodiment of the invention.

Subsequently, advantageous effects of the receiver device for optical transmission according to this embodiment will be explained using the experimental results of FIG. 10. In FIG. 10, the horizontal axis represents optical signal-to-noise ratio (OSNR), and the vertical axis represents the bit error rate (BER).

The results in FIG. 10 were obtained in an optical transmission experiment using an external-cavity laser (ECL) having a wavelength of 1552.12 nm as the transmission wave, with a guard interval (GI) length of 1.28 ns, a transmission speed of 21.7 Gb/sec, and in a back-to-back link.

In FIG. 10, the experimental result indicated by letter A is obtained from an experiment where, in the receiver device according to the fifth embodiment, polarization waves outputted from the processors 2000-1 to 2 are inputted to the timing detector 1002-1 of the receiver device according to the first embodiment explained with reference to FIG. 1. Hereinafter, the receiver device that obtained the experimental result indicated by letter A will be termed the 'receiver device according to the fifth embodiment using the first embodiment'.

In FIG. 10, the experimental result indicated by letter B is obtained from an experiment where, in the receiver device according to the fifth embodiment, polarization waves outputted from the processors 2000-1 to 2 are inputted to the timing detector 1002-1 of the receiver device according to the third embodiment explained with reference to FIG. 4. Hereinafter, the receiver device that obtained the experimental result indicated by letter B will be termed the 'receiver device according to the fifth embodiment using the third embodiment'.

In a receiver device for optical transmission that uses a method of compensating the frequency offset by using a preamble signal as in conventional technology, the carrier frequency is less stable than in wireless transmission, and phase offset cannot be adequately compensated. Consequently, the error rate of the received signal increases to a level where it cannot be demodulated even when using an error correction code. That is, the error rate BER reaches a value that cannot be displayed in FIG. 10.

From the experimental results of FIG. 10 it can be seen that the 'receiver device according to the fifth embodiment using the first embodiment' indicated by the experimental result with letter A and the 'receiver device according to the fifth embodiment using the third embodiment' indicated by the experimental result with letter B obtain BER characteristics that, in contrast to the receiver device using the conventional technology described earlier, can be adequately demodulated using an error correction code, even in optical transmission.

It can further be ascertained from the experimental results of FIG. 10 that the 'receiver device according to the fifth embodiment using the first embodiment' indicated by the experimental result with letter A obtains better BER characteristics than the 'receiver device according to the fifth embodiment using the third embodiment' indicated by the experimental result with letter B.

As is clear from these experimental results, in contrast to a receiver device that uses a method of compensating the frequency offset by using a preamble signal as in the conventional technology, the receiver device according to the fifth embodiment using one of the first to the fourth embodiments can adequately enhance BER characteristics in optical transmission.

As is clear from these experimental results, rather than compensating the phase offset after synthesizing the signals from each port (the X-polarization wave and Y-polarization wave) as in the 'receiver device according to the fifth embodiment using the third embodiment' indicated by the experimental result with letter B, superior characteristics are obtained by compensating the phase offset at each port as in the 'receiver device according to the fifth embodiment using the first embodiment' indicated by the experimental result with letter A. That is, the receiver device with the characteristics indicated by letter A achieves characteristics that are 1 to 2 dB better than the receiver device with the characteristics indicated by letter B.

As described above, according to this embodiment, when residual phase offset that cannot be compensated prior to frequency-domain equalization is re-compensated at each port prior to diversity synthesis after equalization, the phase offset can be compensated and transmission characteristics can be enhanced.

While in the above explanation, the receiver device in the first to the fifth embodiments includes a plurality of receive ports and a plurality of processors respectively corresponding to them, the configuration is not limited to this configuration. For example, the receiver device can include a single receive port and a single processor corresponding to it.

While in the above explanation, each port is provided with a timing detector and timing detection is performed at each port, a plurality or all of the timing detectors can be used commonly; alternatively, a timing detector can be provided for just one port, with the other ports using the detected result of that port.

While in the above explanation, each port is provided with a weight calculator, a plurality or all of the weight calculators can be used commonly. In particular, common use of the weight calculators enables the weight at each port to be taken into consideration in calculating the weight, thereby enhancing the characteristics.

In the signal synthesizer 1012 of the above explanation, the transmission characteristics can be enhanced by multiplying the input signals of each port with the mutually different weights. For example, it is possible to execute post-detection maximum ratio combining, wherein the signal-to-noise ratio (SNR) is calculated based on an equalization weight calculated in the weight calculator, and a weight proportionate to the SNR is used for the multiplication.

While the explanation describes an example where the equalizers execute a frequency-domain equalization using FFT and IFFT, the method need not be frequency-domain equalization; for example, time-domain equalization using a tapped delay-line filter can be used to equalize distortion due to dispersion.

While the above explanation assumes that the transmission is a single-stream transmission (single-input transmission) or a single-polarization transmission, the receiver device according to the abovementioned embodiment is also applicable to multiple-input multiple-output (MIMO) transmission or polarization-multiplexed transmission. In this case, the number of receiver devices need only be one that matches the number of multiplexed sequences.

Figure 11:
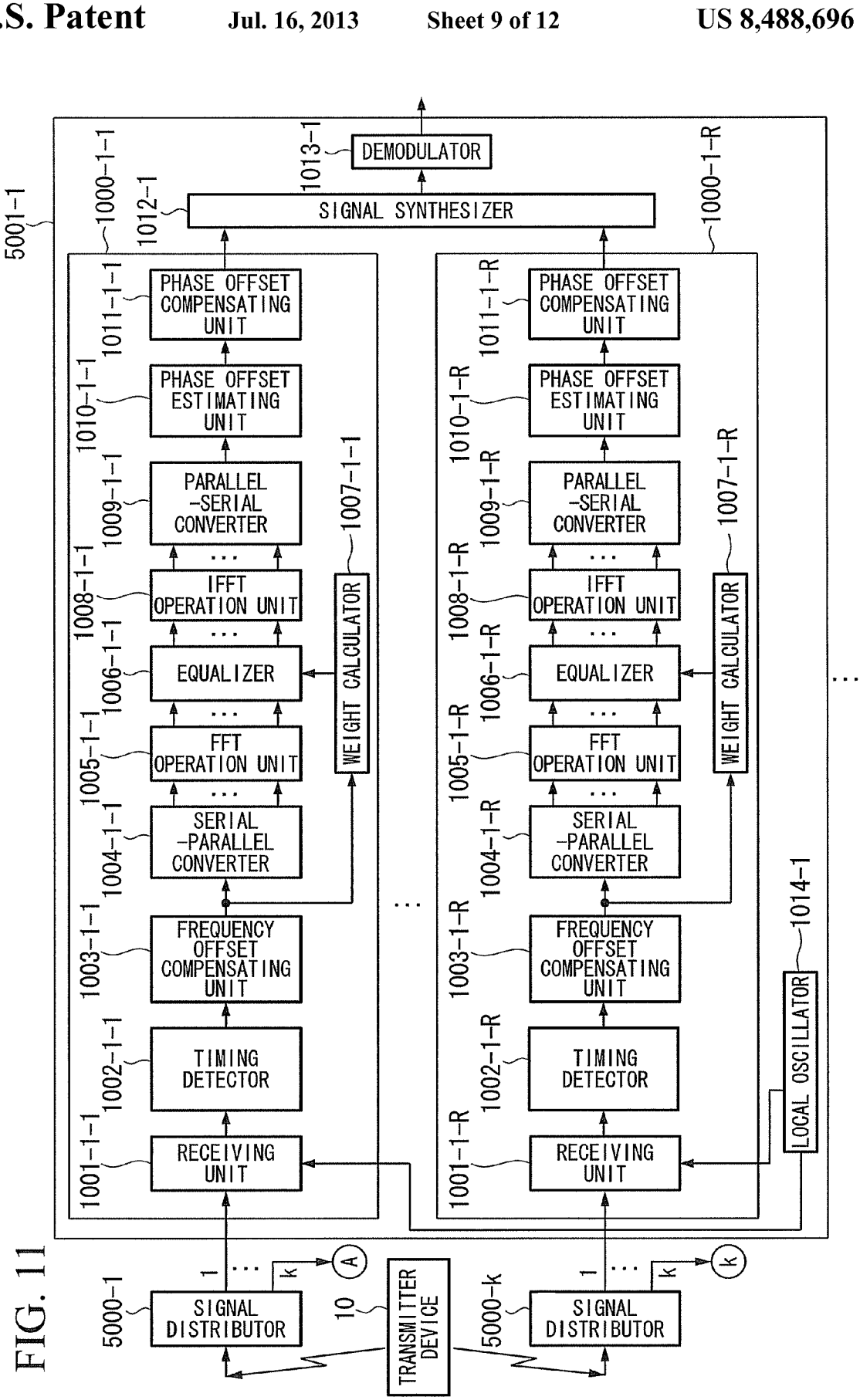
FIG. 11 is a block diagram showing a part of a receiver device according to an embodiment of the invention applied in polarization-multiplexed transmission.
Figure 12:
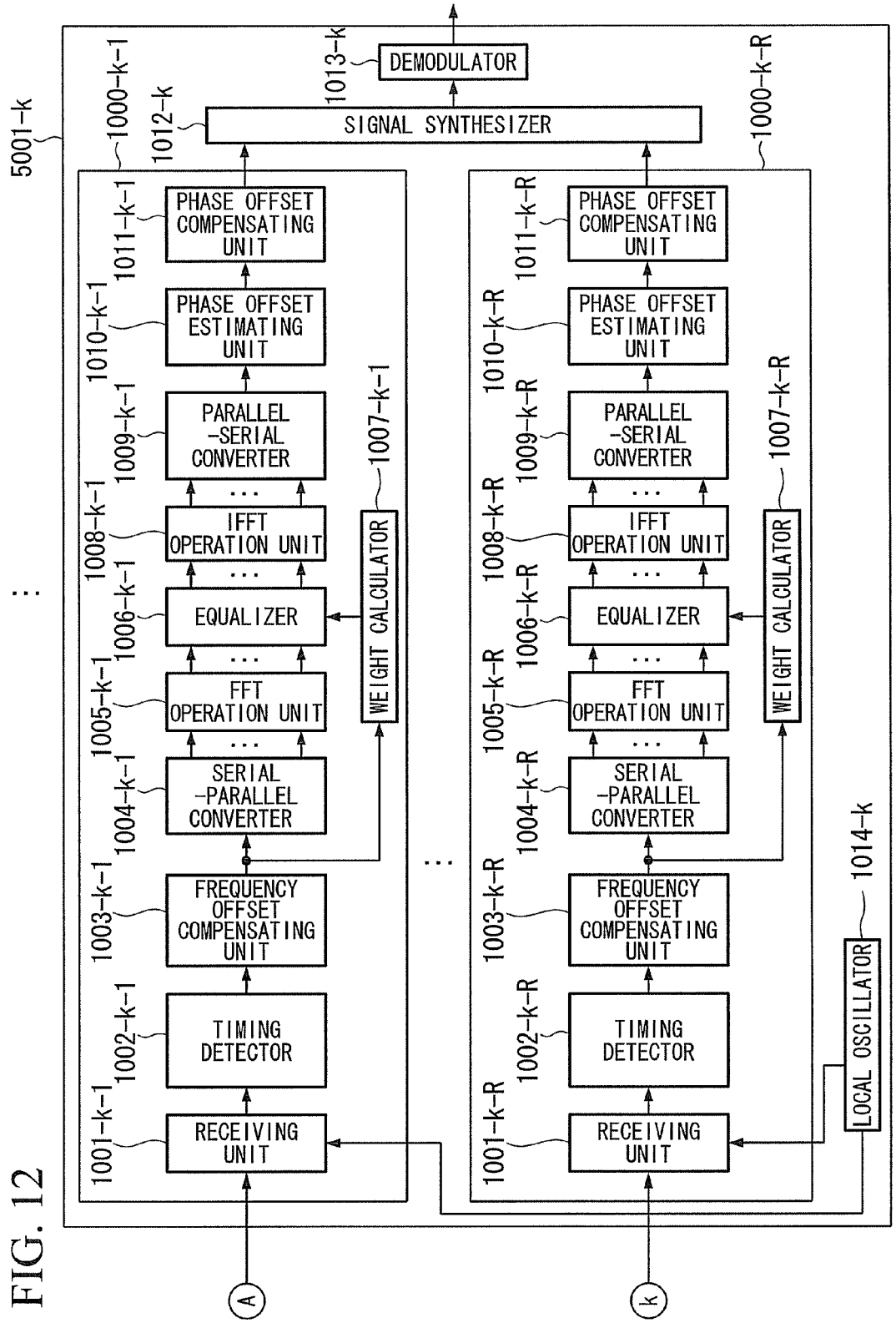
FIG. 12 is a block diagram showing a part of a receiver device according to an embodiment of the invention applied in polarization-multiplexed transmission.

For example, to demodulate multiplexed signals in MIMO transmission using the receiver device according to the first embodiment, as shown in FIGS. 11 and 12, the received signals inputted to each port are distributed by a plurality of signal distributors 5000-1 to k (k=an arbitrary natural number), and signal processing is similarly performed at the plurality of receiver devices 5001-1 to k as in the first embodiment, whereby each sequence can be demodulated.

Here, the method of calculating the equalization weight at the weight calculator can be one used in general MIMO transmission. For example, as shown in Reference Document 5 below, one method of calculating the equalization weight at the weight calculator is to estimate the equalization weight at the weight calculator using known signal.

[Reference Document 5]
I. Barhumi, et al., "Optimal Training Sequences for Channel Estimation in MIMO OFDM Systems in Mobile Wireless Channels," Broadband Communications, 2002. Access, Transmission, Networking. pp. 44-1-44-6, 2002.

Likewise in this case, one or all of a local oscillator, a timing detector, and a weight calculator can be used commonly. In particular, by commonly using the weight calculator, the weight at each port can be taken into consideration in calculating the weight, thereby enhancing the characteristics.

While in the above explanation, the receiver device according to the first embodiment is used in demodulating signals multiplexed in MIMO transmission, the same applies when the receiver device according to the second embodiment to the fourth embodiment is used in demodulating signals multiplexed in MIMO transmission.

While in the first and the second embodiments, the demodulator 1013 demodulates the signal after the signal synthesizer 1012 synthesizes it, a demodulator 1013 can be provided at each port and the signal can be synthesized in a signal synthesizer after being demodulated at each port.

While the configuration described above performs synchronous detection using a local oscillator, the receiver device of this embodiment can also be used in a direct detection method that does not use a local oscillator.

While in the configuration described above, the first to the fourth embodiments are used independently, it is possible to combine a plurality of embodiments. For example, when the first and the second embodiment are combined, the phase offset compensating units 1011-1 to 1011-R are added in a stage following the frequency offset compensating units 2011-1 to 2011-R and the phase offset estimating units 2010-1 to 2010-R, and the phase offset is compensated in two places.

While in the configurations of the first embodiment to the fourth embodiment, the frequency offset compensating units 1003-1 to 1003-R are configured as shown in FIGS. 6 to 8, the invention is not limited to this configuration.

Figure 13:
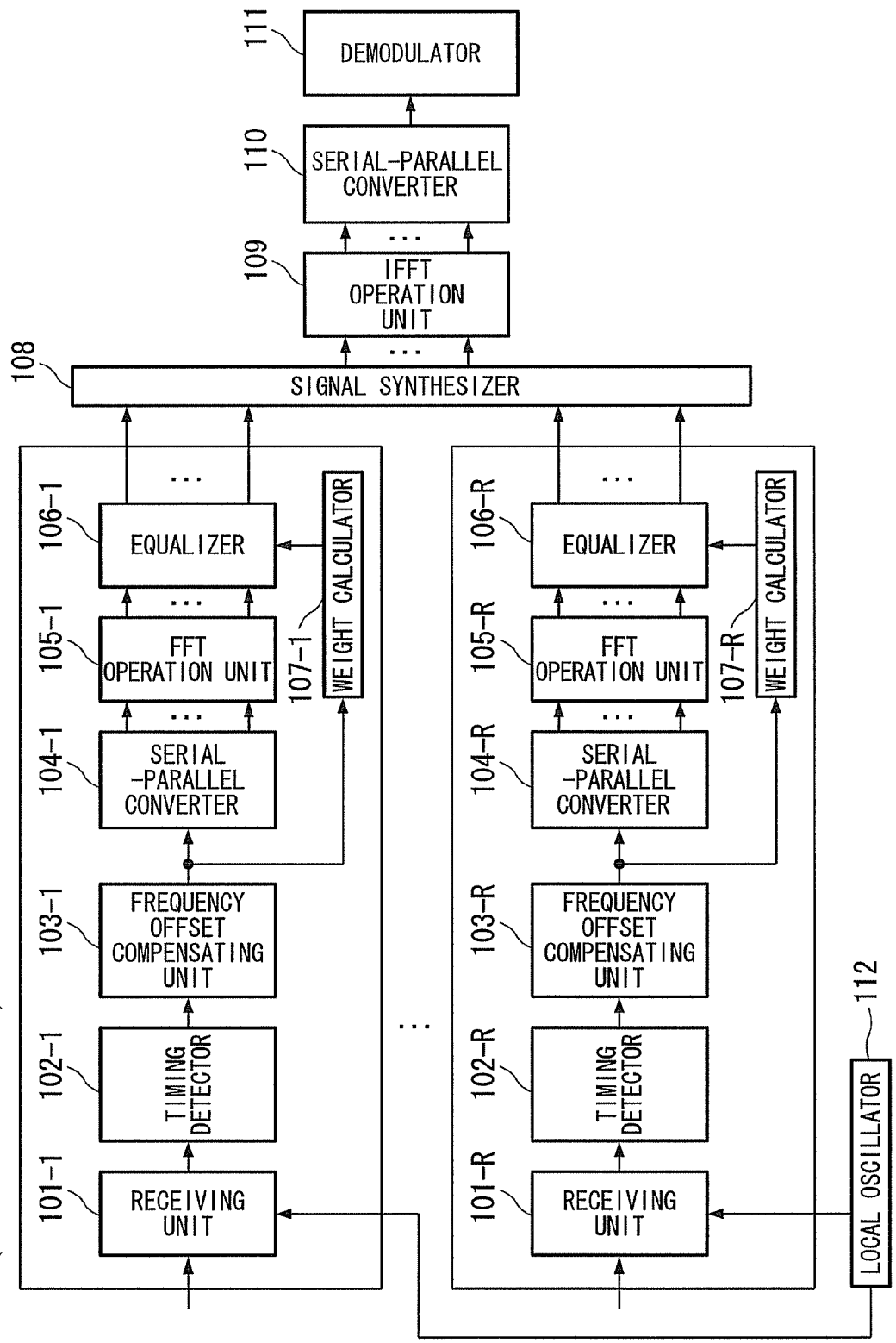
FIG. 13 is a block diagram showing a conventional receiver device.
Figure 14:
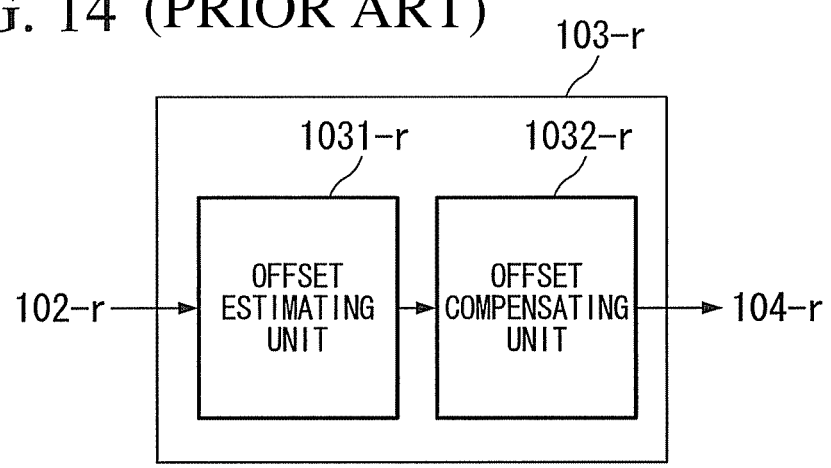
FIG. 14 is a block diagram showing a frequency offset compensating unit in a conventional receiver device.

For example, the frequency offset compensating units 1003-1 to 1003-R can have the configuration of the frequency offset compensating unit in the single-carrier receiver device according to the conventional technology described with reference to FIG. 13. That is, the configuration of the frequency offset compensating units 1003-1 to 1003-R can be used independently from the first embodiment to the fourth embodiment.

In a configuration combining the first embodiment to the fourth embodiment, the frequency offset compensating units 1003-1 to 1003-R can have the configuration described with reference to FIGS. 6 to 8.

The frequency offset-compensated received signal storage unit described earlier is a nonvolatile memory such as a hard disk device, an optical magnetic disk device, and a flash memory, a read-only storage medium such as a CD-ROM, or a volatile memory such as a random access memory (RAM), or a combination of these.

The configurations of the processors 1000, 2000, 3000 and 4000 in FIGS. 1, 3, 4 and 5, and the configurations of the units contained within the processors 1000, 2000, 3000, and 4000, can be realized by special-purpose hardware, or by a memory and a microprocessor.

The configurations of the processors 1000, 2000, 3000, and 4000 in FIGS. 1, 3, 4 and 5, and of the units contained within the processors 1000, 2000, 3000 and 4000, can be formed from a memory and a central processing unit (CPU), programs for realizing the functions of the configurations of the processors 1000, 2000, 3000 and 4000 in FIGS. 1, 3, 4 and 5, and of the configurations of the units contained within the processors 1000, 2000, 3000 and 4000 being loaded to the memories and the functions being realized by executing these programs.

While embodiments of the invention have been explained with reference to the drawings, the specific configuration is not limited to the foregoing embodiments, various modifications being possible without departing from the spirit or scope of the invention.

INDUSTRIAL APPLICABILITY

The invention can be applied in a communication system and a receiver device in wireless communication and optical communication, and can compensate phase offset even when there is temporal phase offset instability or fluctuation, or when the phase offsets of the receive ports do not match.

REFERENCE SYMBOLS 101, 1001, 2001 Receiving unit
102, 1002 Timing detector
103, 1003 Frequency offset compensating unit
104, 1004 Serial-to-parallel converter
105, 1005 FFT operation unit
106, 1006 Equalizer
107, 1007 Weight calculator
108, 1012 IFFT operation unit
109, 1008 Parallel-to-serial converter
110, 1009 Parallel-to-serial converter
111, 1013 Demodulator
112, 1014 Local oscillator
1000, 2000, 3000, 4000 Processor
1010, 2010, 3010, 4010 Phase offset estimating unit
1011, 2011, 3011, 4011 Phase offset compensating unit
2014 Local oscillating light source
10031 First frequency offset estimating unit
10032 First offset compensating unit
10033 Second offset estimating unit
10034 Second offset compensating unit
20011 90 degree polarization-diversity hybrid coupler
20012 BPD (balanced photodiode)
20013 A/D converter
20014 Complex signalizing unit

The invention claimed is:

1. A receiver device that receives a signal supplied to one or a plurality of ports as one or a plurality of received signals, comprising:
one or a plurality of processors that comprises a timing detector that performs timing detection by detecting a signal position of a received signal allocated beforehand from among said one or plurality of received signals in order to form a signal waveform of said received signals allocated beforehand, a frequency offset compensating unit that compensates a frequency offset of the received signal that is timing-detected by said timing detector, a serial-to-parallel converter that subjects the received signal compensated by said frequency offset compensating unit to a serial-to-parallel conversion, a Fourier transform unit that performs a Fourier transform of the received signal subjected to the serial-to-parallel conversion by said serial-to-parallel converter, an equalizer that equalizes the received signal subjected to the Fourier transform by said Fourier transform unit to each frequency component, an inverse Fourier transform unit that subjects the received signal equalized by said equalizer to an inverse Fourier transform, and a parallel-to-serial converter that subjects the received signal subjected to the inverse Fourier transform by said inverse Fourier transform unit to a parallel-to-serial conversion;
a signal synthesizer that synthesizes the signal waveform formed by said one or plurality of said processors;
a demodulator that demodulates the signal waveform synthesized by said signal synthesizer;
a phase offset estimating unit arranged on a received signal conversion path that runs from said timing detector to said demodulator to estimate a phase offset of the received signal on the basis of a unique word of each signal block contained in said received signal; and
a phase offset compensating unit arranged on said received signal conversion path to compensate the phase offset of the received signal on said received signal conversion path on the basis of the phase offset estimated by said phase offset estimating unit.

2. The receiver device according to claim 1, wherein:
said phase offset estimating unit is arranged downstream of said parallel-to-serial converter to estimate said phase offset of the received signal on the basis of the received signal subjected to the parallel-to-serial conversion by said parallel-to-serial converter;
said phase offset compensating unit is arranged downstream of said phase offset estimating unit to compensate the phase of the received signal subjected to the parallel-to-serial conversion by said parallel-to-serial converter on the basis of the phase offset of each signal block estimated by said phase offset estimating unit; and
said signal synthesizer synthesizes the received signal whose phase is compensated by said phase offset compensating unit.

3. The receiver device according to claim 1, wherein:
said phase offset estimating unit is arranged downstream of said parallel-to-serial converter to estimate said phase offset on the basis of the received signal subjected to the parallel-to-serial conversion by said parallel-to-serial converter;
said phase offset compensating unit is arranged downstream of said frequency offset compensating unit to compensate the phase of the received signal compensated by said frequency offset compensating unit on the basis of the phase offset of each signal block estimated by said phase offset estimating unit; and
said signal synthesizer synthesizes the received signal whose phase is compensated by said phase offset compensating unit.

4. The receiver device according to claim 1, wherein:
said phase offset estimating unit is arranged downstream of said signal synthesizer to estimate said phase offset of the received signal on the basis of the received signal synthesized by said signal synthesizer;
said phase offset compensating unit is arranged downstream of said phase offset estimating unit to compensate the phase of the received signal synthesized by said signal synthesizer on the basis of the phase offset of each signal block estimated by said phase offset estimating unit; and
said signal synthesizer synthesizes the received signal subjected to the parallel-to-serial conversion by said parallel-to-serial converter.

5. The receiver device according to claim 1, wherein:
said phase offset estimating unit is arranged downstream of said signal synthesizer to estimate said phase offset of the received signal on the basis of the received signal synthesized by said signal synthesizer;
said phase offset compensating unit is arranged downstream of said frequency offset estimating unit to compensate the phase of the received signal compensated by said frequency offset compensating unit on the basis of the phase offset of each signal block estimated by said phase offset estimating unit; and
said signal synthesizer synthesizes the received signal subjected to the parallel-to-serial conversion by said parallel-to-serial converter.

6. The receiver device according to claim 1, wherein:
each signal block of said received signal contains a preamble signal and a plurality of said unique words; and
said frequency offset compensating unit comprises
a first frequency offset estimating unit that uses the preamble signal contained in the received signal timing-detected by said timing detector to calculate a first frequency offset estimated value,
a first frequency offset compensating unit that uses the first frequency offset estimated value calculated by said first frequency offset estimating unit to compensate the frequency offset of the received signal timing-detected by said timing detector,
a second frequency offset estimating unit that uses the plurality of the unique words contained in the received signal whose frequency offset is compensated by said first frequency offset compensating unit to calculate a second frequency offset estimated value, and
a second frequency offset compensating unit that uses the second frequency offset estimated value calculated by said second frequency offset estimating unit to compensate the frequency offset of the received signal whose frequency offset is compensated by said first frequency offset compensating unit.

7. The receiver device according to claim 1, further comprising a signal distributor that distributes said one or plurality of received signals, the received signals allocated beforehand from among the received signals distributed by said signal distributor being supplied to said one or plurality of processors.

8. The receiver device according to claim 1, wherein said phase offset estimating unit estimates said phase offset $\theta(q)$ of said received signal according to the following general equation:

$$\theta(q) = \arg\left\{\sum_{m=1}^{M} y(m, q)x(m)^*\right\}$$

where y(m,q) is the received signal in the q-th signal block, x(m) is a unique word sequence, parameter m is an identification variable for sequentially identifying each unique word block of M blocks, * denotes a complex conjugate, and arg is a function for determining an angle.

9. A communication system comprising:
a transmitter device that transmits a signal in which a unique word is added to each signal block thereof; and
a receiver device that receives a signal supplied to one or a plurality of ports as one or a plurality of received signals;
the receiver device comprising:
one or a plurality of processors that comprises a timing detector that performs timing detection by detecting a signal position of a received signal allocated beforehand from among said one or plurality of received signals in order to form a signal waveform of said received signals allocated beforehand, a frequency offset compensating unit that compensates a frequency offset of the received signal that is timing-detected by said timing detector, a serial-to-parallel converter that subjects the received signal compensated by said frequency offset compensating unit to a serial-to-parallel conversion, a Fourier transform unit that performs a Fourier transform of the received signal subjected to the serial-to-parallel conversion by said serial-to-parallel converter, an equalizer that equalizes the received signal subjected to the Fourier transform by said Fourier transform unit to each frequency component, an inverse Fourier transform unit that subjects the received signal equalized by said equalizer to an inverse Fourier transform, and a parallel-to-serial converter that subjects the received signal subjected to the inverse Fourier transform by said inverse Fourier transform unit to a parallel-to-serial conversion;
a signal synthesizer that synthesizes the signal waveform formed by said one or plurality of said processors;
a demodulator that demodulates the signal waveform synthesized by said signal synthesizer;
a phase offset estimating unit arranged on a received signal conversion path that runs from said timing detector to said demodulator to estimate a phase offset of the received signal on the basis of a unique word of each signal block contained in said received signal; and
a phase offset compensating unit arranged on said received signal conversion path to compensate the phase offset of the received signal on said received signal conversion path on the basis of the phase offset estimated by said phase offset estimating unit.

10. The communication system according to claim 9, wherein:
said phase offset estimating unit is arranged downstream of said parallel-to-serial converter to estimate said phase offset of the received signal on the basis of the received signal subjected to the parallel-to-serial conversion by said parallel-to-serial converter;
said phase offset compensating unit is arranged downstream of said phase offset estimating unit to compensate the phase of the received signal subjected to the parallel-to-serial conversion by said parallel-to-serial converter on the basis of the phase offset of each signal block estimated by said phase offset estimating unit; and
said signal synthesizer synthesizes the received signal whose phase is compensated by said phase offset compensating unit.

11. The communication system according to claim 9, wherein:
said phase offset estimating unit is arranged downstream of said parallel-to-serial converter to estimate said phase offset of the received signal on the basis of the received signal subjected to the parallel-to-serial conversion by said parallel-to-serial converter;
said phase offset compensating unit is arranged downstream of said frequency offset compensating unit to compensate the phase of the received signal compensated by said frequency offset compensating unit on the basis of the phase offset of each signal block estimated by said phase offset estimating unit; and
said signal synthesizer synthesizes the received signal whose phase is compensated by said phase offset compensating unit.

12. The communication system according to claim 9, wherein:
said phase offset estimating unit is arranged downstream of said signal synthesizer to estimate said phase offset of the received signal on the basis of the received signal synthesized by said signal synthesizer;
said phase offset compensating unit is arranged downstream of said phase offset estimating unit to compensate the phase of the received signal synthesized by said signal synthesizer on the basis of the phase offset of each signal block estimated by said phase offset estimating unit; and said signal synthesizer synthesizes the received signal subjected to the parallel-to-serial conversion by said parallel-to-serial converter.

13. The communication system according to claim 9, wherein:
said phase offset estimating unit is arranged downstream of said signal synthesizer to estimates said phase offset of the received signal on the basis of the received signal synthesized by said signal synthesizer;
said phase offset compensating unit is arranged downstream of said frequency offset estimating unit to compensate the phase of the received signal compensated by said frequency offset compensating unit on the basis of the phase offset of each signal block estimated by said phase offset estimating unit; and
said signal synthesizer synthesizes the received signal subjected to the parallel-to-serial conversion by said parallel-to-serial converter.

14. The communication system according to claim 9, wherein:
each signal block of said received signal contains a preamble signal and a plurality of said unique words; and
said frequency offset compensating unit comprises
a first frequency offset estimating unit that uses the preamble signal contained in the received signal timing-detected by said timing detector to calculate a first frequency offset estimated value,
a first frequency offset compensating unit that uses the first frequency offset estimated value calculated by said first frequency offset estimating unit to compensate the frequency offset of the received signal timing-detected by said timing detector,
a second frequency offset estimating unit that uses the plurality of the unique words contained in the received signal whose frequency offset is compensated by said first frequency offset compensating unit to calculate a second frequency offset estimated value, and
a second frequency offset compensating unit that uses the second frequency offset estimated value calculated by said second frequency offset estimating unit to compensate the frequency offset of the received signal whose frequency offset is compensated by said first frequency offset compensating unit.

15. The communication system according to claim 9, further comprising a signal distributor that distributes said one or plurality of received signals, the received signals allocated beforehand from among the received signals distributed by said signal distributor being supplied to said one or plurality of processors.

16. The communication system according to claim 9, wherein said phase offset estimating unit estimates said phase offset θ(q) of said received signal according to the following general equation:

$$\theta(q) = \arg\left\{\sum_{m=1}^{M} y(m, q)x(m)^*\right\}$$

where y(m,q) is the received signal in the q-th signal block, x(m) is a unique word sequence, parameter m is an identification variable for sequentially identifying each unique word block of M blocks, * denotes a complex conjugate, and arg is a function for determining an angle.

17. A receiving method used in a receiver device that receives a signal supplied to one or a plurality of ports as one or a plurality of received signals, the method comprising:
a processing step comprising a timing-detection step of performing timing detection with respect to said one or plurality of received signals by detecting a signal position of a received signal allocated beforehand from among said one or plurality of received signals, a frequency offset compensation step of compensating a frequency offset of the received signal that is timing-detected in said timing detection step, a serial-to-parallel conversion step of subjecting the received signal compensated in said frequency offset compensation step to a serial-to-parallel conversion, a Fourier transform step of performing a Fourier transform of the received signal subjected to the serial-to-parallel conversion in said serial-to-parallel conversion step, an equalization step of equalizing the received signal subjected to the Fourier transform in said Fourier transform step to each frequency component, an inverse Fourier transform step of subjecting the received signal equalized in said equalization step to an inverse Fourier transform, and a parallel-to-serial conversion step of subjecting the received signal subjected to an inverse Fourier transform in said inverse Fourier transform step to a parallel-to-serial conversion;
a signal synthesis step of synthesizing the signal waveform formed in said processing step;
a demodulation step of demodulating the signal waveform synthesized in said signal synthesis step;
a phase offset estimation step of estimating a phase offset of the received signal that runs from said timing-detection step to said demodulation step on the basis of a unique word of each signal block contained in said received signal; and
a phase offset compensation step of compensating the phase offset of the received signal on the basis of the phase offset estimated in said phase offset estimation step.

18. The receiving method according to claim 17, wherein:
said phase offset estimation step is performed subsequent to said parallel-to-serial conversion step to estimate said phase offset on the basis of the received signal subjected to the parallel-to-serial conversion in said parallel-to-serial conversion step;
said phase offset compensation step is performed subsequent to said phase offset estimation step to compensate the phase of the received signal subjected to the parallel-to-serial conversion in said parallel-to-serial conversion step on the basis of the phase offset of each signal block estimated by said phase offset estimation step; and
said signal synthesis step synthesizes the received signal whose phase is compensated in said phase offset compensation step.

19. The receiving method according to claim 17, wherein:
said phase offset estimation step is performed subsequent to said parallel-to-serial conversion step to estimate said phase offset on the basis of the received signal subjected to the parallel-to-serial conversion in said parallel-to-serial conversion step;
said phase offset compensation step is performed subsequent to said frequency offset compensation step to compensate the phase of the received signal compensated in said frequency offset compensation step on the basis of the phase offset of each signal block estimated by said phase offset estimation step; and
said signal synthesis step synthesizes the received signal whose phase is compensated in said phase offset compensation steps.

20. The receiving method according to claim 17, wherein:
said phase offset estimation step is performed subsequent to said signal synthesis step to estimate said phase offset on the basis of the received signal synthesized in said signal synthesis step;
said phase offset compensation step is performed subsequent to said phase offset estimation step to compensate the phase of the received signal synthesized in said signal synthesis step on the basis of the phase offset of each signal block estimated in said phase offset estimation step; and
said signal synthesis step synthesizes the received signal subjected to the parallel-to-serial conversion in said parallel-to-serial conversion step.

21. The receiving method according to claim 17, wherein:
said phase offset estimation step is performed subsequent to said signal synthesis step to estimate said phase offset on the basis of the received signal synthesized in said signal synthesis step;
said phase offset compensation step is performed subsequent to said frequency offset estimation step to compensate the phase of the received signal compensated in said frequency offset compensation step on the basis of the phase offset of each signal block estimated in said phase offset estimation step; and
said signal synthesis step synthesizes the received signal subjected to the parallel-to-serial conversion in said parallel-to-serial conversion step.

22. The receiving method according to claim 17, wherein:
each signal block of said received signal contains a preamble signal and a plurality of said unique words; and
said frequency offset compensation step comprises
a first frequency offset estimation step of using the preamble signal contained in the received signal timing-detected in said timing-detection step to calculate a first frequency offset estimated value,
a first frequency offset compensation step of using the first frequency offset estimated value calculated in said first frequency offset estimation step to compensate the frequency offset of the received signal timing-detected in said timing-detection step,
a second frequency offset estimation step of using the plurality of the unique words contained in the received signal whose frequency offset is compensated in said first frequency offset compensation step to calculate a second frequency offset estimated value, and
a second frequency offset compensation step of using the second frequency offset estimated value calculated in said second frequency offset estimation step to compensate the frequency offset of the received signal whose frequency offset is compensated in said first frequency offset compensation step.

23. The receiving method according to claim 17, further comprising:
a signal distribution step of distributing said one or plurality of received signals; and
a supply step of supplying the received signal allocated beforehand from among the received signals distributed in said signal distribution step, to said processing step.

24. The receiving method according to claim 17, wherein said phase offset estimation step estimates said phase offset $\theta(q)$ of said received signal according to the following general equation:

$$\theta(q) = \arg\left\{\sum_{m=1}^{M} y(m, q)x(m)^*\right\}$$

where y(m,q) is the received signal in the q-th signal block, x(m) is a unique word sequence, parameter m is an identification variable for sequentially identifying each unique word block of M blocks, * denotes a complex conjugate, and arg is a function for determining an angle.

* * * * *